(12) United States Patent
Yan et al.

(10) Patent No.: US 12,556,621 B2
(45) Date of Patent: *Feb. 17, 2026

(54) CONTENT DELIVERY NETWORK CDN EDGE NODE SCHEDULING METHOD AND DEVICE

(71) Applicant: Petal Cloud Technology Co., Ltd., Dongguan (CN)

(72) Inventors: Wei Yan, Dongguan (CN); Wei Wang, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,429

(22) Filed: Dec. 15, 2023

(65) Prior Publication Data
US 2024/0114080 A1     Apr. 4, 2024

Related U.S. Application Data

(63) Continuation of application No. 17/431,843, filed as application No. PCT/CN2020/074869 on Feb. 12, 2020, now Pat. No. 11,888,958.

(30) Foreign Application Priority Data

Feb. 18, 2019   (CN) .......................... 201910123527.6

(51) Int. Cl.
*H04L 67/63*        (2022.01)
*H04L 65/1045*      (2022.01)
(Continued)

(52) U.S. Cl.
CPC .......... *H04L 67/63* (2022.05); *H04L 65/1045* (2022.05); *H04L 65/1069* (2013.01);
(Continued)

(58) Field of Classification Search
CPC ... H04L 67/63; H04L 67/563; H04L 65/1045; H04L 65/612; H04L 65/611; H04L 65/1069; H04L 67/1021
(Continued)

(56) References Cited

U.S. PATENT DOCUMENTS

2002/0073199 A1   6/2002   Levine et al.
2009/0164661 A1   6/2009   Kim et al.
(Continued)

FOREIGN PATENT DOCUMENTS

CN    101984637 A    3/2011
CN    102255942 A    11/2011
(Continued)

OTHER PUBLICATIONS

Ye, J., et al., "Dynamic Scheduling Algorithms for Streaming Media Based on Hybrid Content Delivery Network," Computer Science, 2013, Issue 02, 5 pages.

*Primary Examiner* — Suraj M Joshi
(74) *Attorney, Agent, or Firm* — Conley Rose, P.C.

(57) ABSTRACT

A content delivery network (CDN) edge node scheduling method includes receiving, by a scheduling proxy server, a first request message from a terminal device, determining, based on a first Internet Protocol (IP) address and configuration information, a target CDN scheduling center corresponding to the first IP address, sending a second request message to the target CDN scheduling center when the target CDN scheduling center supports proxy scheduling setting, receiving the second IP address from the target CDN scheduling center, and sending a request response message to the terminal device to obtain delivery content from the target CDN edge node based on the second IP address.

20 Claims, 12 Drawing Sheets

(51) Int. Cl.
*H04L 65/1069* (2022.01)
*H04L 65/611* (2022.01)
*H04L 65/612* (2022.01)
*H04L 67/1021* (2022.01)
*H04L 67/563* (2022.01)

(52) U.S. Cl.
CPC .......... *H04L 65/611* (2022.05); *H04L 65/612* (2022.05); *H04L 67/1021* (2013.01); *H04L 67/563* (2022.05)

(58) Field of Classification Search
USPC ....................................................... 709/224
See application file for complete search history.

(56) References Cited

U.S. PATENT DOCUMENTS

| | | | | |
|---|---|---|---|---|
| 2015/0341414 A1* | 11/2015 | Gao | ......................... | H04L 65/40 709/203 |
| 2016/0285913 A1 | 9/2016 | Itskin et al. | | |
| 2017/0164020 A1* | 6/2017 | Li | ......................... | H04N 21/222 |
| 2017/0366635 A1* | 12/2017 | Martini | .................. | H04L 63/08 |

FOREIGN PATENT DOCUMENTS

| | | |
|---|---|---|
| CN | 102710765 A | 10/2012 |
| CN | 102739779 A | 10/2012 |
| CN | 102790798 A | 11/2012 |
| CN | 104301408 A | 1/2015 |
| CN | 105872577 A | 8/2016 |
| CN | 105897850 A | 8/2016 |
| CN | 105915945 A | 8/2016 |
| CN | 106161664 A | 11/2016 |
| CN | 106961451 A | 7/2017 |
| CN | 107124621 A | 9/2017 |
| CN | 107404480 A | 11/2017 |
| CN | 108337327 A | 7/2018 |
| CN | 109831511 A | 5/2019 |
| WO | 2015179244 A1 | 11/2015 |
| WO | 2016074323 A1 | 5/2016 |

* cited by examiner

CONTENT DELIVERY NETWORK CDN EDGE NODE SCHEDULING METHOD AND DEVICE

CROSS-REFERENCE TO RELATED APPLICATIONS

This is a continuation of U.S. patent application Ser. No. 17/431,843 filed on Aug. 18, 2021, which is a National Stage of International Patent Application No. PCT/CN2020/074869 filed on Feb. 12, 2020, which claims priority to Chinese Patent Application No. 201910123527.6 filed on Feb. 18, 2019. All of the aforementioned patent applications are hereby incorporated by reference in their entireties.

TECHNICAL FIELD

This application relates to the communications field, and in particular, to a content delivery network (content delivery network, CDN) edge node scheduling method and a device.

BACKGROUND

A video service operator uses a CDN to provide a service such as video on demand or live broadcast for a user, and usually uses service capabilities of a plurality of CDN vendors.

For a video play request of the user, a global server load balance (global server load balance, GSLB) scheduling system of the CDN schedules the request to a CDN edge node closest to the user according to a scheduling method, which is usually a proximity scheduling principle, and the CDN edge node provides a service for the user. In an existing system, a terminal-side application (application, APP) directly initiates a request to the GSLB scheduling system of the CDN, and the GSLB scheduling system sends an internet protocol (internet protocol, IP) address of a source end based on the request, determines an area in which the user is located, and schedules the request to a CDN edge node that serves the area.

The GSLB scheduling system, also referred to as a scheduling center, schedules the video play request (also referred to as a CDN access request) of the user to the CDN edge node according to a specific scheduling rule, for example, a policy such as proximity scheduling or quality first. The CDN scheduling center usually supports two manners: hypertext transfer protocol (hypertext transfer protocol, HTTP) scheduling and domain name system (domain name system, DNS) scheduling.

In each of the foregoing two scheduling manners, a terminal device needs to send a domain name resolution request to a DNS, and the DNS performs DNS domain name resolution. DNS domain hijacking is prone to occur. The DNS domain hijacking means that the domain name resolution request is intercepted in a hijacked network, an incorrect IP address is returned for a domain name that is applied for, and consequently, a user cannot access a server corresponding to the domain name or accesses an incorrect website. Due to DNS domain hijacking, a problem such as an incorrect returned IP address of a CDN edge node occurs. This causes a play failure. Currently, more than 50% of video service play failures are caused by hijacking of GSLB domain names.

SUMMARY

Embodiments of this application provide a CDN edge node scheduling method and a device, to ensure correctness of an IP address that is of a CDN edge node and that is obtained by a terminal device, so as to increase a content obtaining success rate, and further increase a play success rate.

According to a first aspect, a CDN edge node scheduling method is provided. A scheduling proxy server receives a first request message from a terminal device, where the first request message includes a first IP address, and the first IP address is an IP address of the terminal device. The scheduling proxy server determines, based on the first IP address and preconfigured configuration information of a CDN scheduling center, a target CDN scheduling center corresponding to the first IP address. The scheduling proxy server sends a second request message to the target CDN scheduling center when the target CDN scheduling center supports proxy scheduling setting, where the second request message includes the first IP address, so that the target CDN scheduling center determines a second IP address based on the first IP address, and the second IP address is an IP address of a target CDN edge node corresponding to the first IP address. The scheduling proxy server receives the second IP address sent by the target CDN scheduling center. The scheduling proxy server sends a request response message to the terminal device, where the request response message carries the second IP address, so that the terminal device obtains delivery content from the target CDN edge node based on the second IP address.

In this embodiment of this application, after receiving the first request message from the terminal device, the scheduling proxy server first determines, based on the IP address of the terminal device, the target CDN scheduling center corresponding to the IP address. Subsequently, the scheduling proxy server instead of the terminal device sends the second request message to the target CDN scheduling center when the target CDN scheduling center supports proxy scheduling setting, where the second request message includes the first IP address, so that the target CDN scheduling center performs scheduling based on the first IP address to obtain the second IP address, and the second IP address is the IP address of the target CDN edge node. Then, the scheduling proxy server receives the second IP address sent by the target CDN scheduling center. Finally, the scheduling proxy server sends the request response message to the terminal device, where the request response message carries the second IP address, so that the terminal device obtains the delivery content from the target CDN edge node based on the second IP address. In other words, in this embodiment of this application, the configuration information of the CDN scheduling center is preconfigured in the scheduling proxy server. After the scheduling proxy server receives the request message of the terminal device, for the target CDN scheduling center that supports scheduling proxy, the scheduling proxy server instead of the terminal device sends a scheduling request to the target CDN scheduling center. This process does not relate to a domain name resolution process between the terminal device and a DNS, so that correctness of the IP address that is of the CDN edge node and that is obtained by the terminal device can be ensured. Therefore, a content obtaining success rate is increased, and a play success rate is increased.

The delivery content may be but is not limited to play content such as a video or audio, or may be content of another type, for example, content of a text type.

The play success rate is a key indicator of user experience for a video. The play success rate is a percentage of a quantity of successful play times of a user in a total quantity of play times.

In a possible implementation, when the target CDN scheduling center does not support proxy scheduling setting, the scheduling proxy server sends a request response message to the terminal device, where the request response message carries a third IP address, and the third IP address is an IP address of the target CDN scheduling center, so that the terminal device obtains the second IP address from the target CDN scheduling center based on the third IP address, and obtains the delivery content from the target CDN edge node based on the second IP address. According to this implementation, the scheduling proxy server also considers the target CDN scheduling center that does not support proxy scheduling. For the target CDN scheduling center that does not support proxy scheduling, the scheduling proxy server returns the IP address of the target CDN scheduling center to the terminal device. This process does not relate to a domain name resolution process between the terminal device and a DNS, so that correctness of the IP address that is of the target CDN scheduling center and that is obtained by the terminal device can be ensured. Therefore, a content obtaining success rate is increased, and a play success rate is increased.

In a possible implementation, the first request message is used by the terminal device to request the scheduling proxy server to perform authentication on the delivery content. In this case, before the scheduling proxy server determines, based on the first IP address and the preconfigured configuration information of the CDN scheduling center, the target CDN scheduling center corresponding to the first IP address, the scheduling proxy server determines, based on the first request message, that an authentication result of the delivery content is that the authentication succeeds. According to this implementation, in addition to proxy scheduling, the scheduling proxy server further needs to perform authentication. This helps reduce a content obtaining delay on the basis of increasing a content obtaining success rate, and further helps reduce a play start delay on the basis of increasing a play success rate.

The play start delay is a key indicator of user experience for a video. The play start delay is a delay interval from a moment at which a user taps the video to a moment at which the video starts to be played.

Further, the request response message further includes the authentication result indicating that the authentication on the delivery content succeeds. According to this implementation, two types of information: scheduling information and authentication information can be obtained through one time of interaction between the terminal device and the scheduling proxy server. This helps further reduce the content obtaining delay, and then reduce the play start delay.

In a possible implementation, the configuration information includes information about a correspondence between an IP address of a terminal device and a CDN scheduling center, and information about whether the CDN scheduling center supports proxy scheduling. According to this implementation, the configuration information is preconfigured, so that the scheduling proxy server can determine, based on the IP address of the terminal device, the target CDN scheduling center corresponding to the IP address, and determine whether the target CDN scheduling center supports proxy scheduling.

In a possible implementation, the configuration information includes information about a correspondence between an IP address of a terminal device and a user area, information about a correspondence between a user area and a CDN scheduling center, and information about whether the CDN scheduling center supports proxy scheduling. According to this implementation, the configuration information is preconfigured, so that the scheduling proxy server can first determine, based on the IP address of the terminal device, a user area in which the terminal device is located, then determine, based on the user area, the target CDN scheduling center corresponding to the IP address, and determine whether the target CDN scheduling center supports proxy scheduling.

In a possible implementation, when the target CDN scheduling center supports proxy scheduling setting, the request response message further carries first indication information, and the first indication information is used to indicate that the second IP address is the IP address of the target CDN edge node corresponding to the first IP address. According to this implementation, because the request response message may carry the second IP address or the third IP address, indication information carried in the request response message may be used to indicate a meaning of the IP address. For example, the first indication information is carried, so that after the terminal device obtains the IP address, the terminal device performs corresponding processing, to implement compatibility with the CDN scheduling center that supports proxy scheduling and the CDN scheduling center that does not support proxy scheduling.

In a possible implementation, when the target CDN scheduling center does not support proxy scheduling setting, the request response message further carries second indication information, and the second indication information is used to indicate that the third IP address is the IP address of the target CDN scheduling center. According to this implementation, because the request response message may carry the second IP address or the third IP address, indication information carried in the request response message may be used to indicate a meaning of the IP address. For example, the second indication information is carried, so that after the terminal device obtains the IP address, the terminal device performs corresponding processing, to implement compatibility with the CDN scheduling center that supports proxy scheduling and the CDN scheduling center that does not support proxy scheduling.

According to a second aspect, a CDN edge node scheduling method is provided. A terminal device sends a first request message to a scheduling proxy server, where the first request message includes a first IP address, and the first IP address is an IP address of the terminal device. The terminal device receives a request response message from the scheduling proxy server, where when a target CDN scheduling center corresponding to the first IP address supports proxy scheduling setting, the request response message carries a second IP address, and the second IP address is an IP address of a target CDN edge node corresponding to the first IP address. The terminal device obtains delivery content from the target CDN edge node based on the second IP address.

In this embodiment of this application, the terminal device cooperates with the scheduling proxy server. For the target CDN scheduling center that supports proxy scheduling, the terminal device may directly obtain the IP address of the target CDN edge node from the scheduling proxy server. This process does not relate to a domain name resolution process between the terminal device and a DNS, so that correctness of the IP address that is of the CDN edge node and that is obtained by the terminal device can be ensured. Therefore, a content obtaining success rate is increased, and a play success rate is increased.

In a possible implementation, when the target CDN scheduling center corresponding to the first IP address does not support proxy scheduling setting, the request response message carries a third IP address, and the third IP address is an IP address of the target CDN scheduling center; and the terminal device obtains the second IP address from the target CDN scheduling center based on the third IP address, and obtains the delivery content from the target CDN edge node based on the second IP address. According to this implementation, two cases: a case in which the target CDN scheduling center supports proxy scheduling and a case in which the target CDN scheduling center does not support proxy scheduling are considered, and the terminal device may perform corresponding processing based on a specific meaning of the IP address carried in the request response message.

In a possible implementation, the first request message is used by the terminal device to request the scheduling proxy server to perform authentication on the delivery content; and the request response message further includes an authentication result indicating that the authentication on the delivery content succeeds. According to this implementation, two types of information: scheduling information and authentication information can be obtained through one time of interaction between the terminal device and the scheduling proxy server. This helps reduce a content obtaining delay, and then reduce a play start delay.

Further, when the target CDN scheduling center supports proxy scheduling setting, the request response message further carries first indication information, and the first indication information is used to indicate that the second IP address is the IP address of the target CDN edge node corresponding to the first IP address. According to this implementation, the terminal device can identify a meaning of the IP address carried in the request response message, so as to perform corresponding processing.

Further, when the target CDN scheduling center does not support proxy scheduling setting, the request response message further carries second indication information, and the second indication information is used to indicate that the third IP address is the IP address of the target CDN scheduling center. According to this implementation, the terminal device can identify a meaning of the IP address carried in the request response message, so as to perform corresponding processing.

According to a third aspect, a CDN edge node scheduling method is provided. A CDN scheduling center receives a scheduling request message from a scheduling proxy server, where the scheduling request message is triggered by first request information sent by a terminal device, the first request message includes a first IP address, the first IP address is an IP address of the terminal device, and the scheduling request message includes the first IP address. The CDN scheduling center determines a second IP address based on the first IP address, where the second IP address is an IP address of a target CDN edge node corresponding to the first IP address. The CDN scheduling center sends the second IP address to the scheduling proxy server, so that after the scheduling proxy server sends the second IP address to the terminal device, the terminal device obtains delivery content from the target CDN edge node based on the second IP address.

In this embodiment of this application, the CDN scheduling center receives the scheduling request message from the scheduling proxy server instead of receiving a scheduling request message from the terminal device, and the CDN scheduling center performs scheduling based on the IP address that is of the terminal device and that is carried in the scheduling request message. This process does not relate to a domain name resolution process between the terminal device and a DNS, so that correctness of the IP address that is of the CDN edge node and that is obtained by the terminal device can be ensured. Therefore, a content obtaining success rate is increased, and a play success rate is increased.

According to a fourth aspect, an embodiment of this application provides a scheduling proxy server. The scheduling proxy server may implement a function performed in the method design in the first aspect, and the function may be implemented by hardware, or may be implemented by hardware executing corresponding software. The hardware or software includes one or more modules corresponding to the function.

In a possible design, a structure of the scheduling proxy server includes a processor, and the processor is configured to support the scheduling proxy server in performing the corresponding function in the method in the first aspect. The scheduling proxy server may further include a memory. The memory is configured to be coupled to the processor, and the memory stores program instructions and data that are necessary for the scheduling proxy server. The scheduling proxy server may further include a transceiver, and the transceiver is configured to send or receive information or the like.

According to a fifth aspect, an embodiment of this application provides a terminal device. The terminal device may implement a function performed in the method design in the second aspect, and the function may be implemented by hardware, or may be implemented by hardware executing corresponding software. The hardware or software includes one or more modules corresponding to the function.

In a possible design, a structure of the terminal device includes a processor, and the processor is configured to support the terminal device in performing the corresponding function in the method in the second aspect. The terminal device may further include a memory. The memory is configured to be coupled to the processor, and the memory stores program instructions and data that are necessary for the terminal device. The terminal device may further include a transceiver, and the transceiver is configured to send or receive information or the like.

According to a sixth aspect, an embodiment of this application provides a CDN scheduling center. The CDN scheduling center may implement a function performed in the method design in the third aspect, and the function may be implemented by hardware, or may be implemented by hardware executing corresponding software. The hardware or software includes one or more modules corresponding to the function.

In a possible design, a structure of the CDN scheduling center includes a processor, and the processor is configured to support the terminal device in performing the corresponding function in the method in the third aspect. The CDN scheduling center may further include a memory. The memory is configured to be coupled to the processor, and the memory stores program instructions and data that are necessary for the CDN scheduling center. The CDN scheduling center may further include a transceiver, and the transceiver is configured to send or receive information or the like.

According to a seventh aspect, an embodiment of this application provides a communications apparatus. The communications apparatus may be, for example, a chip, the communications apparatus may be disposed in a scheduling proxy server, and the communications apparatus includes a processor and an interface. The processor is configured to support the communications apparatus in performing a corresponding function in the method in the first aspect. The interface is configured to support communication between the communications apparatus and another communications apparatus or another network element. The communications apparatus may further include a memory. The memory is configured to be coupled to the processor, and the memory stores program instructions and data that are necessary for the communications apparatus.

According to an eighth aspect, an embodiment of this application provides a communications apparatus. The communications apparatus may be, for example, a chip, the communications apparatus may be disposed in a terminal device, and the communications apparatus includes a processor and an interface. The processor is configured to support the communications apparatus in performing a corresponding function in the method in the second aspect. The interface is configured to support communication between the communications apparatus and another communications apparatus or another network element. The communications apparatus may further include a memory. The memory is configured to be coupled to the processor, and the memory stores program instructions and data that are necessary for the communications apparatus.

According to a ninth aspect, an embodiment of this application provides a communications apparatus. The communications apparatus may be, for example, a chip, the communications apparatus may be disposed in a CDN scheduling center, and the communications apparatus includes a processor and an interface. The processor is configured to support the communications apparatus in performing a corresponding function in the method in the third aspect. The interface is configured to support communication between the communications apparatus and another communications apparatus or another network element. The communications apparatus may further include a memory. The memory is configured to be coupled to the processor, and the memory stores program instructions and data that are necessary for the communications apparatus.

According to a tenth aspect, an embodiment of this application provides a computer storage medium. The computer storage medium stores instructions, and when the instructions are run on a computer, the computer is enabled to perform the method in any one of the first aspect or the possible designs of the first aspect, the method in any one of the second aspect or the possible designs of the second aspect, or the method in any one of the third aspect or the possible designs of the third aspect.

According to an eleventh aspect, an embodiment of this application provides a computer program product. The computer program product includes instructions, and when the program is executed by a computer, the instructions enable the computer to perform the method in any one of the first aspect or the possible designs of the first aspect, the method in any one of the second aspect or the possible designs of the second aspect, or the method in any one of the third aspect or the possible designs of the third aspect.

According to a twelfth aspect, an embodiment of this application provides a computer program. The computer program includes instructions, and when the program is executed by a computer, the instructions enable the computer to perform the method in any one of the first aspect or the possible designs of the first aspect, the method in any one of the second aspect or the possible designs of the second aspect, or the method in any one of the third aspect or the possible designs of the third aspect.

The method and apparatus provided in the embodiments of this application relate to the scheduling proxy server, the terminal device, and the CDN scheduling center. The scheduling proxy server instead of the terminal device sends the scheduling request message to the CDN scheduling center. This avoids a domain name resolution process between the terminal device and a DNS, and can ensure correctness of the IP address that is of the CDN edge node and that is obtained by the terminal device, so that a content obtaining success rate is increased, and then a play success rate is increased. Further, because interaction between the terminal device and a network device is reduced, a content obtaining delay can be reduced, and then a play start delay can be reduced.

DESCRIPTION OF EMBODIMENTS

The following describes technical solutions in the embodiments of this application with reference to accompanying drawings.

Figure 1A:
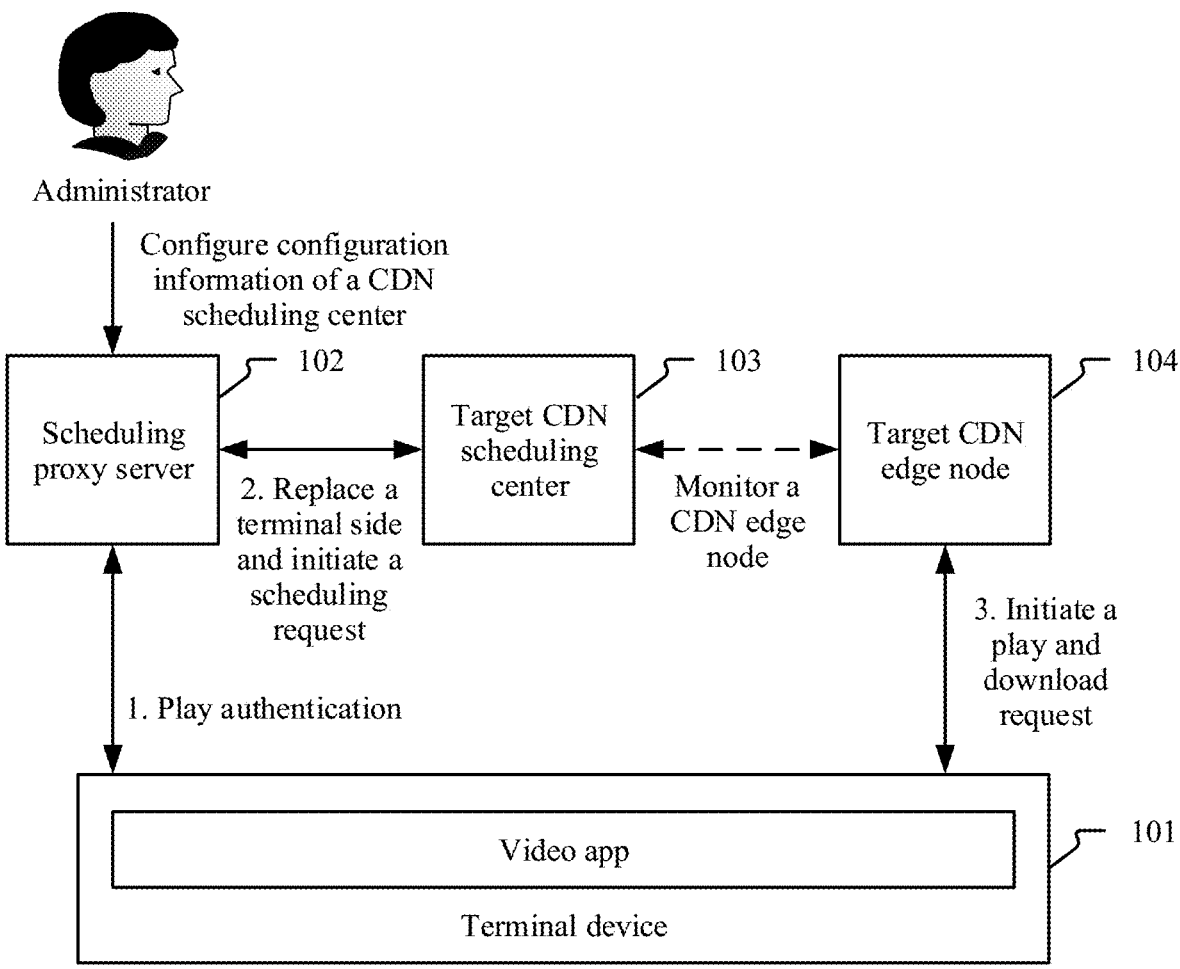
FIG. 1A is a schematic diagram of an application scenario according to an embodiment of this application.

FIG. 1A is a schematic diagram of an application scenario according to an embodiment of this application. This application scenario relates to CDN edge node scheduling. Execution bodies include a terminal device 101 on which a video app is installed, a scheduling proxy server 112, a target CDN scheduling center 103, and a target CDN edge node 104. It should be noted that in this embodiment of this application, there may be a plurality of CDNs for providing a video play service, each CDN corresponds to one CDN scheduling center, and the CDN scheduling center is responsible for scheduling a plurality of CDN edge nodes included in the CDN. In this application scenario, it is assumed that each CDN scheduling center supports proxy scheduling, for example, cloud-side proxy scheduling. Usually, to schedule a CDN edge node, the target CDN scheduling center 103 that provides a service for the terminal device 101 needs to be first determined, and then the target CDN edge node 104 that provides a service for the terminal device 101 is determined by using the target CDN scheduling center 103. Different from that in a regular implementation, in this embodiment of this application, the terminal device does not first obtain an IP address of the target CDN scheduling center 103 and then initiate a scheduling request to the target CDN scheduling center 103, but the scheduling proxy server 102 instead of the terminal device initiates a scheduling request to the target CDN scheduling center 103, and combines a play authentication process and a domain name resolution process. A DNS does not need to perform domain name resolution. In addition to performing play authentication, the scheduling proxy server instead of the terminal device further needs to send a scheduling request message to the target CDN scheduling center. An IP address of the target CDN edge node that provides a service for the terminal device can be obtained through the play authentication process, so that correctness of the IP address that is of the target CDN edge node and that is obtained by the terminal device can be ensured. Therefore, a play success rate is increased.

In an example, an administrator may preconfigure an IP address of a CDN scheduling center in the scheduling proxy server 102. Alternatively, an IP address corresponding to a domain name of a CDN scheduling center is preconfigured on a DNS resolution website (for example, DNS POD). After the video app on the terminal device 101 initiates a video play, the terminal device 101 first sends a play authentication request message to the scheduling proxy server 102. After authenticating content and a user, the scheduling proxy server 102 serves as a cloud-side proxy of the terminal device 101, and sends the scheduling request message to the target CDN scheduling center 103. The target CDN scheduling center 103 processes the scheduling request message, and returns, to the scheduling proxy server 102 according to a principle such as proximity scheduling, the IP address of the target CDN edge node 104 that provides a service for the terminal device 101. The scheduling proxy server 102 returns a play authentication response message to the terminal device 101, where the play authentication response message not only carries an authentication result, but also carries the IP address of the target CDN edge node 104 that provides a service for the terminal device 101. The video app on the terminal device 101 initiates a play and download request to the target CDN edge node 104 based on the IP address.

In this embodiment of this application, the scheduling proxy server serves as the cloud-side proxy of the terminal device, and sends the scheduling request message to the target CDN scheduling center. Compared with a regular implementation in which the terminal device sends a scheduling request message to the target CDN scheduling center, this embodiment of this application has the following advantages: 1. A current problem of a play failure caused due to DNS domain hijacking that exists when a terminal side directly initiates a scheduling request to the target CDN scheduling center is resolved. The IP address of the CDN scheduling center is configured in the scheduling proxy server, or the IP address corresponding to the domain name of the CDN scheduling center is configured on system DNS POD. Therefore, a hijacking problem in domain name resolution does not exist when the terminal side initiates the request to the target CDN scheduling center. 2. Compared with that in a case in which the terminal side directly initiates the request to the target CDN scheduling center, message exchange between the terminal side and a cloud side is reduced, so that a play start delay is greatly reduced. Precise scheduling can be implemented in a cloud-side proxy scheduling manner. An HTTP request is initiated to the target CDN scheduling center on a scheduling proxy server side. Compared with that in a terminal-side HTTP scheduling manner, a quantity of interaction times is decreased by 1. Particularly, if the scheduling proxy server and the target CDN scheduling center are deployed in equipment rooms close to each other, even compared with that in DNS scheduling, a scheduling delay is greatly reduced, so that a play start delay is reduced, and user experience is improved.

It should be noted that, in the application scenario shown in FIG. 1A, the scheduling proxy server 102 implements two functions: play authentication and scheduling proxy, and the scheduling proxy server 102 may be considered as a play authentication server. In another possible implementation, the two functions: play authentication and scheduling proxy may be separately performed by two devices. The scheduling proxy server 102 implements only the scheduling proxy function, and a play authentication server on a network side implements the play authentication function. In this implementation, the scheduling proxy server implements the scheduling proxy function, and a DNS does not need to perform domain name resolution, so that correctness of the IP address that is of the CDN edge node and that is obtained by the terminal device can be ensured. Therefore, a play success rate is increased.

In addition, in this embodiment of this application, cloud-side proxy scheduling is merely a specific implementation of proxy scheduling, and is not intended to limit this application.

Figure 1B:
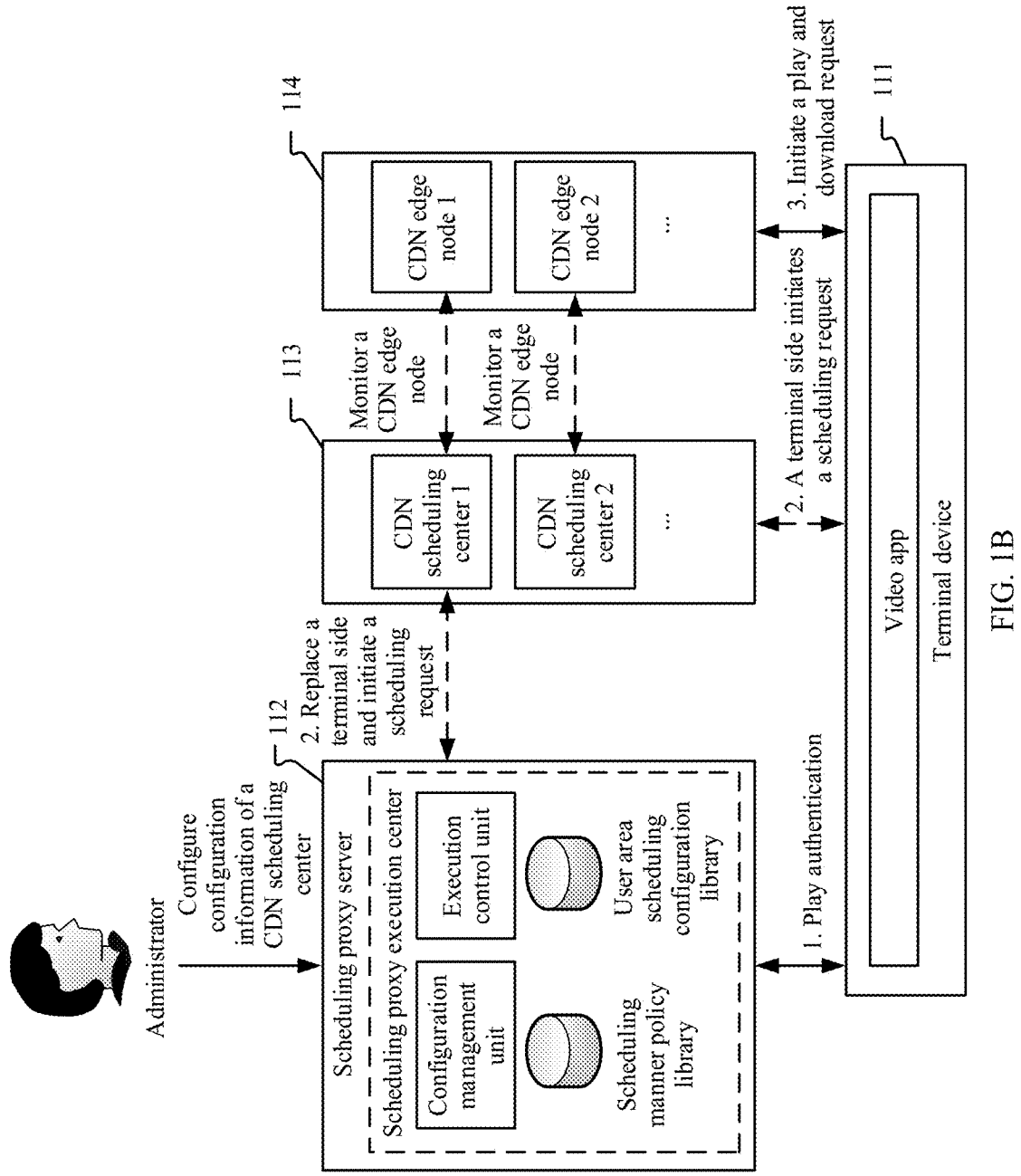
FIG. 1B is a schematic diagram of another application scenario according to an embodiment of this application.

FIG. 1B is a schematic diagram of another application scenario according to an embodiment of this application. This application scenario relates to CDN edge node scheduling. Execution bodies include a terminal device 111 on which a video app is installed, a scheduling proxy server 112, CDN scheduling centers 113, and CDN edge nodes 114. It should be noted that in this embodiment of this application, there are a plurality of CDNs for providing a video play service, each CDN corresponds to one CDN scheduling center, and the CDN scheduling center is responsible for scheduling a plurality of CDN edge nodes included in the CDN. In this application scenario, it is assumed that in a plurality of CDN scheduling centers, some CDN scheduling centers support proxy scheduling, for example, cloud-side proxy scheduling, and some CDN scheduling centers do not support proxy scheduling. For example, a CDN scheduling center 1 supports cloud-side proxy scheduling, and a CDN scheduling center 2 does not support cloud-side proxy scheduling. Usually, to schedule a CDN edge node, a target CDN scheduling center that provides a service for the terminal device needs to be first determined, and then a target CDN edge node that provides a service for the terminal device is determined by using the target CDN scheduling center. Different from that in a regular implementation, in this embodiment of this application, the terminal device does not first obtain an IP address of the target CDN scheduling center 103 and then initiate a scheduling request to the target CDN scheduling center 103, but the scheduling proxy server 112 instead of the terminal device initiates a scheduling request to the target CDN scheduling center 103, and combines a play authentication process and a domain name resolution process. Domain name resolution does not need to be performed, and scheduling information related to the target CDN scheduling center can be directly obtained through play authentication, so that correctness of an IP address that is of the target CDN edge node and that is obtained by the terminal device can be ensured. Therefore, a play success rate is increased.

In this embodiment of this application, compatibility with the CDN scheduling center that supports cloud-side proxy scheduling and the CDN scheduling center that does not support cloud-side proxy scheduling can be implemented. For example, for the CDN scheduling center 1 that supports cloud-side proxy scheduling, the scheduling proxy server may obtain an IP address that is determined by the CDN scheduling center 1 and that is of a CDN edge node 1 providing a service for the terminal device 111, and return the IP address of the CDN edge node 1 to the terminal device 111. For the CDN scheduling center 2 that does not support cloud-side proxy scheduling, the scheduling proxy server may obtain an IP address of the CDN scheduling center 2, and return the IP address of the CDN scheduling center 2 to the terminal device 111. The terminal device 111 sends a scheduling request message to the CDN scheduling center 2 based on the IP address of the CDN scheduling center 2, and receives an IP address that is determined by the CDN scheduling center 2 and that is of a CDN edge node 2 providing a service for the terminal device 111.

In an example, the scheduling proxy server 112 includes a scheduling proxy execution center, and the scheduling proxy execution center further includes a configuration management unit, an execution control unit, a scheduling manner policy library, and a user area scheduling configuration library.

That an administrator configures configuration information of the CDN scheduling centers includes configuring the scheduling manner policy library and the user area scheduling configuration library.

The administrator configures the scheduling manner policy library by using the configuration management unit, for example, configures whether each CDN scheduling center supports a cloud-side proxy scheduling policy, and the administrator configures the user area scheduling configuration library by using the configuration management unit, for example, configures a CDN scheduling center that provides a service in an area in which a user is located. In addition, an IP address of each CDN scheduling center may also be configured by the administrator. The area in which the user is located is determined based on an IP address of an app of the user, and then a specific CDN scheduling center that provides a service is learned.

In an example, the administrator may preconfigure the IP address of the CDN scheduling center in the scheduling proxy server 112. Alternatively, on a DNS resolution website (for example, DNS POD), an IP address corresponding to a domain name of the CDN scheduling center is preconfigured, a correspondence between an area in which a user is located and a CDN scheduling center is preconfigured, and whether each CDN scheduling center supports cloud-side proxy scheduling is preconfigured. After the video app on the terminal device 111 initiates a video play, the terminal device 111 first sends a play authentication request message to the scheduling proxy server 112. After authenticating content and the user, the scheduling proxy server 112 finds, through querying based on an IP address of the terminal device 111, the CDN scheduling center in the area in which the user is located, and then determines whether the CDN scheduling center supports cloud-side proxy scheduling. If the CDN scheduling center supports cloud-side proxy scheduling, the execution control unit initiates a scheduling request to the CDN scheduling center, and returns, to a terminal side, an IP address of a target CDN edge node (an IP address of a CDN edge node that provides a service for the terminal device 111) that is returned by the CDN scheduling center. If the CDN scheduling center does not support cloud-side proxy scheduling, the scheduling proxy server 112 returns an IP address of the CDN scheduling center to a terminal side, and provides an identifier for indication. Subsequently, a terminal-side app initiates a scheduling request to the CDN scheduling center based on the received IP address of the CDN scheduling center.

In this embodiment of this application, for the CDN scheduling center that supports cloud-side scheduling proxy, the scheduling proxy server serves as a cloud-side proxy of the terminal device, and sends a scheduling request message to the CDN scheduling center. Compared with those in a regular implementation in which the terminal device sends a scheduling request message to the CDN scheduling center, a play success rate can be increased, a play start delay can be reduced, and user experience can be improved. In addition, for the CDN scheduling center that does not support cloud-side scheduling proxy, the scheduling proxy server returns the IP address of the CDN scheduling center to the terminal device. Compared with those in a regular implementation in which the terminal device first performs play authentication and then obtains the IP address of the CDN scheduling center through domain name resolution, a play success rate can be increased, a play start delay can be reduced, and user experience can be improved.

It should be noted that, in the application scenario shown in FIG. 1B, the scheduling proxy server 112 implements two functions: play authentication and scheduling proxy, and the scheduling proxy server 112 may be considered as a play authentication server. In another possible implementation, the two functions: play authentication and scheduling proxy may be separately performed by two devices. The scheduling proxy server 112 implements only the scheduling proxy function, and a play authentication server on a network side implements the play authentication function. In this implementation, the scheduling proxy server implements the scheduling proxy function, and a DNS does not need to perform domain name resolution, so that correctness of the IP address that is of the target CDN scheduling center and that is obtained by the terminal device or correctness of the IP address that is of the target CDN edge node and that is obtained by the terminal device can be ensured. Therefore, a play success rate is increased.

In addition, in this embodiment of this application, cloud-side proxy scheduling is merely a specific implementation of proxy scheduling, and is not intended to limit this application.

Figure 2:
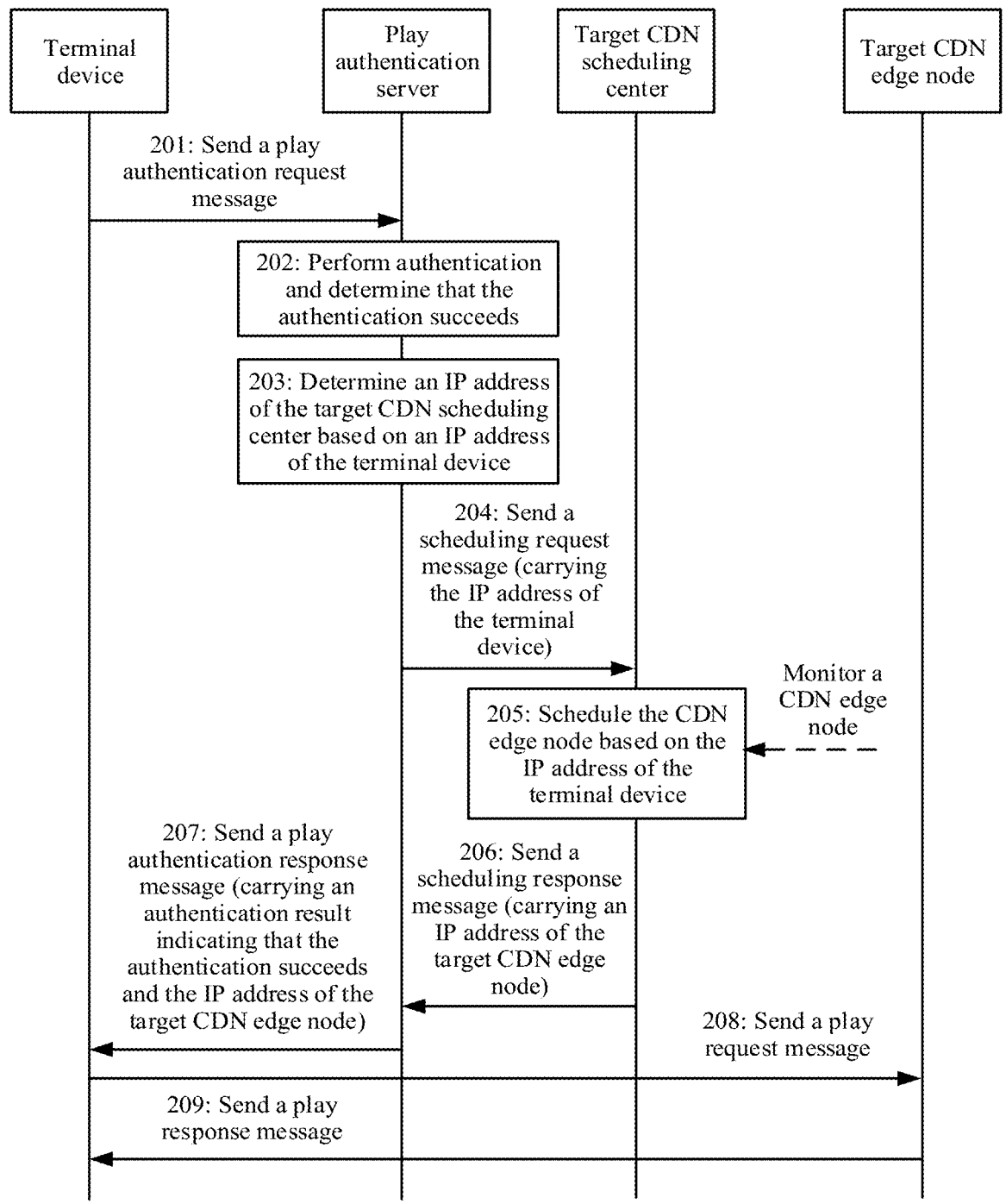
FIG. 2 is a schematic communication diagram of a CDN edge node scheduling method according to an embodiment of this application.

FIG. 2 is a schematic communication diagram of a CDN edge node scheduling method according to an embodiment of this application. This embodiment may be based on the application scenario shown in FIG. 1A. To be specific, it is assumed that all CDN scheduling centers support cloud-side proxy scheduling, and it is assumed that a play authentication server serves as a scheduling proxy server. The following operation procedure may be included.

Step 201: A terminal device sends a play authentication request message to the play authentication server, where the play authentication request message is used to request to perform authentication on a target user and/or target content, and an IP address of the terminal device is a first IP address.

Step 202: The play authentication server performs authentication on the target user and/or the target content based on the play authentication request message, and determines that an authentication result is that the authentication succeeds.

It may be understood that, if the authentication result is that the authentication fails, a subsequent processing procedure does not need to be performed, and a play authentication response message may be directly returned to the terminal device. The play authentication response message carries the authentication result indicating that the authentication fails.

Step 203: The play authentication server determines, based on the first IP address, an IP address of a target CDN scheduling center that provides a service for the terminal device.

In an example, a correspondence between a user area identifier and a CDN identifier and a correspondence between a CDN identifier and an identifier of a CDN scheduling center are preconfigured in the play authentication server. In step 203, a user area identifier corresponding to the terminal device may be determined based on the first IP address, then an identifier of a target CDN that provides a service for the terminal device is sequentially determined, and an identifier of a CDN scheduling center corresponding to the target CDN is determined.

Step 204: The play authentication server sends a scheduling request message to the target CDN scheduling center based on the IP address of the target CDN scheduling center, where the scheduling request message carries the first IP address, and the scheduling request message is used to request the target CDN scheduling center to schedule a CDN edge node based on the first IP address.

The IP address of the CDN scheduling center may be preconfigured in the play authentication server, and an administrator may preconfigure a correspondence between an identifier of a CDN scheduling center and an IP address of the CDN scheduling center, or preconfigure a correspondence between a domain name of a CDN scheduling center and an IP address of the CDN scheduling center.

Step 205: The target CDN scheduling center schedules the CDN edge node based on the first IP address.

It may be understood that the CDN scheduling center may determine, according to a proximity first policy, an IP address of a target CDN edge node that provides a service for the terminal device.

Step 206: The target CDN scheduling center sends a scheduling response message to the play authentication server, where the scheduling response message carries a second IP address, and the second IP address is the IP address of the scheduled target CDN edge node in the target CDN.

Step 207: The play authentication server sends a play authentication response message to the terminal device, where the play authentication response message carries the authentication result indicating that the authentication succeeds and the second IP address.

Step 208: The terminal device sends, based on the second IP address, a play request message to the CDN edge node corresponding to the second IP address.

Step 209: The terminal device receives a play response message from the CDN edge node corresponding to the second IP address.

In this embodiment of this application, after receiving the play authentication request message from the terminal device, the play authentication server performs authentication on the target user and/or the target content, and when determining that the authentication result is that the authentication succeeds, further determines, based on the IP address of the terminal device, the target CDN scheduling center that provides a service for the terminal device. In addition, the play authentication server obtains, based on configuration information of the CDN scheduling center, the IP address of the target CDN scheduling center, obtains the IP address of the target CDN edge node from the target CDN scheduling center, and finally uses the play authentication response message sent to the terminal device to carry the authentication result indicating that the authentication succeeds and the IP address of the CDN edge node. In other words, in this embodiment of this application, a play authentication process and a domain name resolution process are combined, and the terminal device does not need to request a DNS to perform domain name resolution, but can directly obtain the IP address of the scheduled CDN edge node in the target CDN through play authentication, so that correctness of the IP address that is of the CDN edge node and that is obtained by the terminal device can be ensured. Therefore, a play success rate is increased, and a play start delay is reduced.

It may be understood that, in the embodiment shown in FIG. 2, the play authentication server implements two functions: play authentication and scheduling proxy, and the play authentication server may be considered as a scheduling proxy server. In another possible implementation, the two functions: play authentication and scheduling proxy may be separately performed by two devices, the play authentication server implements only the play authentication function, and a scheduling proxy server is added to a network side to implement the scheduling proxy function. For example, the scheduling proxy server receives a first request message from a terminal device, where the first request message includes a first IP address, and the first IP address is an IP address of the terminal device. The scheduling proxy server determines, based on the first IP address and preconfigured configuration information of a CDN scheduling center, a target CDN scheduling center corresponding to the first IP address. The scheduling proxy server sends a second request message to the target CDN scheduling center when the target CDN scheduling center supports proxy scheduling setting, where the second request message includes the first IP address, so that the target CDN scheduling center determines a second IP address based on the first IP address, and the second IP address is an IP address of a target CDN edge node corresponding to the first IP address. The scheduling proxy server receives the second IP address sent by the target CDN scheduling center. The scheduling proxy server sends a request response message to the terminal device, where the request response message carries the second IP address, so that the terminal device obtains delivery content from the target CDN edge node based on the second IP address. In this implementation, the scheduling proxy server implements the scheduling proxy function, and a DNS does not need to perform domain name resolution, so that correctness of the IP address that is of the CDN edge node and that is obtained by the terminal device can be ensured. Therefore, a play success rate is increased.

The delivery content may be but is not limited to play content such as a video or audio, or may be content of another type, for example, content of a text type. In this embodiment of this application, only the play content is used as an example for description.

Figure 3:
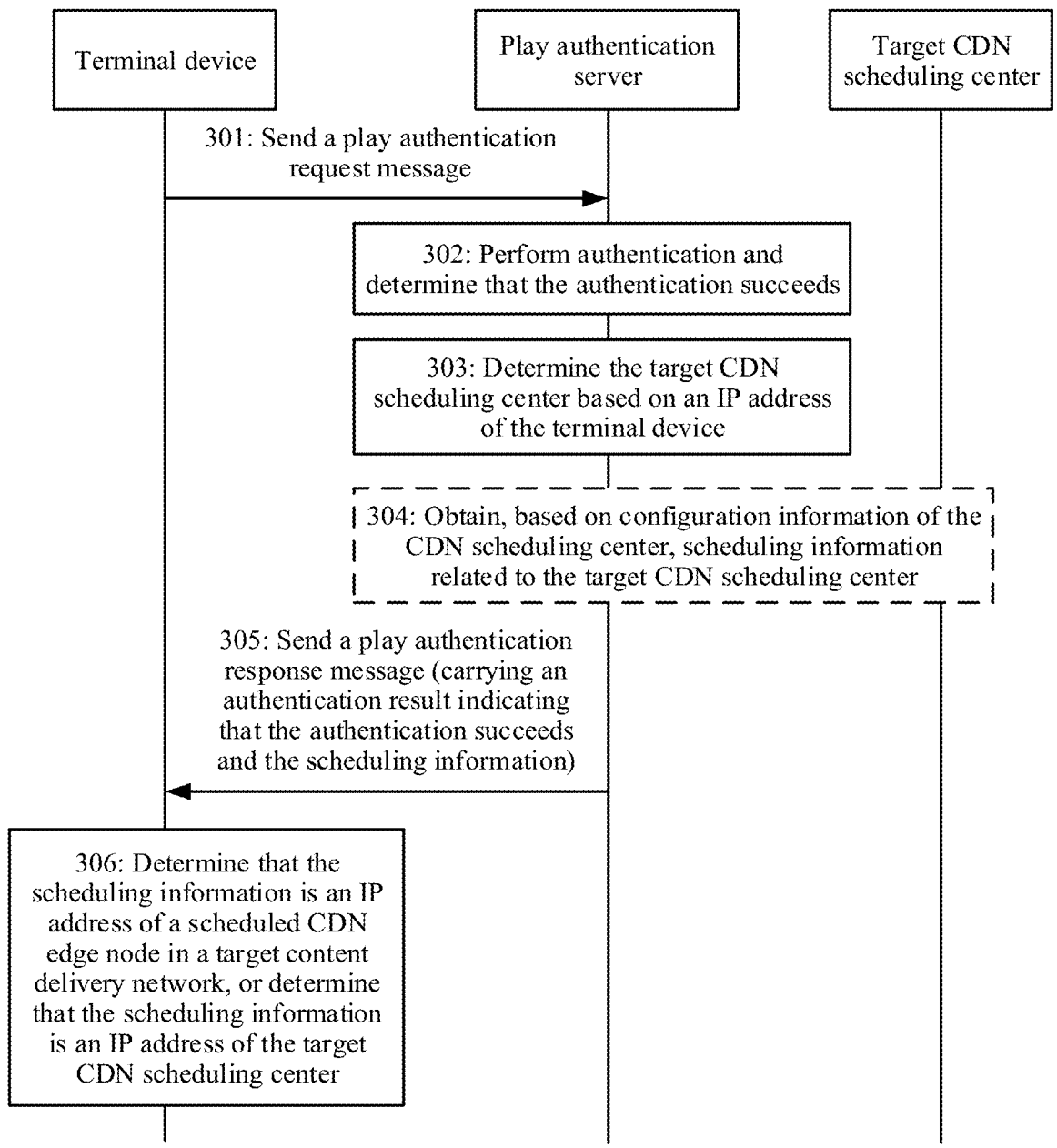
FIG. 3 is a schematic communication diagram of another CDN edge node scheduling method according to an embodiment of this application.

FIG. 3 is a schematic communication diagram of another CDN edge node scheduling method according to an embodiment of this application. This embodiment may be based on the application scenario shown in FIG. 1B. To be specific, it is assumed that some CDN scheduling centers support cloud-side proxy scheduling and some CDN scheduling centers do not support cloud-side proxy scheduling, and it is assumed that a play authentication server serves as a scheduling proxy server. The following operation procedure may be included.

Step 301: A terminal device sends a play authentication request message to the play authentication server, where the play authentication request message is used to request to perform authentication on a target user and/or target content, and an internet protocol IP address of the terminal device is a first IP address.

Step 302: The play authentication server performs authentication on the target user and/or the target content based on the play authentication request message, and determines that an authentication result is that the authentication succeeds.

It may be understood that, if the authentication result is that the authentication fails, a subsequent processing procedure does not need to be performed, and a play authentication response message may be directly returned to the terminal device. The play authentication response message carries the authentication result indicating that the authentication fails.

Step 303: The play authentication server determines, based on the first IP address, a target CDN scheduling center that provides a service for the terminal device.

Step 304: The play authentication server obtains, based on configuration information of the CDN scheduling center, scheduling information related to the target CDN scheduling center.

In this embodiment of this application, the scheduling information has different types based on whether the CDN scheduling center supports cloud-side proxy scheduling. When the CDN scheduling center supports cloud-side proxy scheduling, the scheduling information is an IP address of a scheduled target CDN edge node in a target CDN. When the CDN scheduling center does not support cloud-based proxy scheduling, the scheduling information is an IP address of the CDN scheduling center. Whether the CDN scheduling center supports cloud-side proxy scheduling and the IP address of the CDN scheduling center may be determined based on the configuration information of the CDN scheduling center. It should be noted that the IP address of the CDN scheduling center is preconfigured by an administrator in the play authentication server. After the IP address of the CDN scheduling center changes, the administrator needs to update the IP address of the CDN scheduling center in the play authentication server in a timely manner.

In an example, the play authentication server determines, based on the configuration information of the CDN scheduling center, whether the CDN scheduling center supports cloud-side proxy scheduling. When determining that the CDN scheduling center supports cloud-side proxy scheduling, the play authentication server sends a scheduling request message to the CDN scheduling center, where the scheduling request message carries the first IP address, and the scheduling request message is used to request the CDN scheduling center to schedule a node in the target content delivery network based on the first IP address. The play authentication server receives a scheduling response message from the CDN scheduling center, where the scheduling response message carries a second IP address, and the second IP address is the IP address of the scheduled CDN edge node in the target content delivery network; and determines the second IP address as the scheduling information related to the scheduling center.

In this embodiment of this application, a format of the scheduling request message is changed, and an IP address of a terminal side is extended and added to the scheduling request message based on an existing protocol of performing scheduling by a CDN scheduling center (HTTP scheduling) for a terminal side. For a request initiated by the terminal side, the play authentication server obtains the IP address of the terminal side that initiates the request. The scheduling request message initiated to the CDN scheduling center by the play authentication server serving as a scheduling proxy carries the IP address of the terminal side. The CDN scheduling center performs scheduling based on the IP address of the terminal side that is carried in the message, instead of performing scheduling based on an IP address of a sending source end.

In another example, the play authentication server determines, based on the configuration information of the scheduling center, whether the CDN scheduling center supports cloud-side proxy scheduling. When determining that the CDN scheduling center does not support cloud-side proxy scheduling, the play authentication server obtains a third IP address, where the third IP address is an IP address of the CDN scheduling center; and determines the third IP address as the scheduling information related to the scheduling center.

Step 305: The play authentication server sends a play authentication response message to the terminal device, where the play authentication response message carries the authentication result indicating that the authentication succeeds and the scheduling information.

In an example, when the scheduling information is the IP address of the scheduled CDN edge node in the target content delivery network, the play authentication response message further carries first indication information, and the first indication information is used to indicate that the second IP address is the IP address of the scheduled CDN edge node in the target content delivery network.

In another example, when the scheduling information is the IP address of the target CDN scheduling center, the play authentication response message further carries second indication information, and the second indication information is used to indicate that the third IP address is the IP address of the target CDN scheduling center.

Step 306: The terminal device determines that the scheduling information is the IP address of the scheduled CDN edge node in the target content delivery network, or determines that the scheduling information is the IP address of the target CDN scheduling center.

Subsequently, the terminal device may select a corresponding processing procedure based on different types of received scheduling information.

For example, when the scheduling information is the second IP address, because the second IP address is the IP address of the scheduled CDN edge node in the target content delivery network, the terminal device sends, based on the second IP address, a play request message to the CDN edge node corresponding to the second IP address, and the terminal device receives a play response message from the CDN edge node corresponding to the second IP address.

For another example, when the scheduling information is the third IP address, because the third IP address is the IP address of the CDN scheduling center, the terminal device first sends a scheduling request message to the CDN scheduling center based on the third IP address, and receives a scheduling response message returned by the CDN scheduling center, where the scheduling response message carries the second IP address, and the second IP address is the IP address of the scheduled CDN edge node in the target content delivery network. Then, the terminal device sends, based on the second IP address, a play request message to the CDN edge node corresponding to the second IP address, and the terminal device receives a play response message from the CDN edge node corresponding to the second IP address.

For example, a first field and a second field are extended and added to the play authentication response message. The first field is used to carry the scheduling information (which may also be referred to as a CDN service address), and the second field is used to carry indication information. The indication information is used to indicate whether content of the first field is the IP address of the CDN edge node. The CDN service address is the IP address of the CDN scheduling center or the IP address of the CDN edge node. Optionally, the CDN service address may alternatively be a domain name of the CDN scheduling center or a domain name of the CDN edge node.

In addition, the scheduling request message received by the CDN scheduling center may be sent by the terminal device, or may be sent by the play authentication server. The scheduling request message sent by the terminal device and the scheduling request message sent by the play authentication server have different formats and correspond to different scheduling manners. In this embodiment of this application, when the CDN scheduling center supports proxy scheduling, the scheduling request message is sent by the play authentication server. When the CDN scheduling center does not support proxy scheduling, the scheduling request message is sent by the terminal device.

In an example, the CDN scheduling center receives a scheduling request message from a scheduling proxy server, where the scheduling request message is triggered by first request information sent by the terminal device, the first request message includes a first IP address, the first IP address is an IP address of the terminal device, and the scheduling request message includes the first IP address. The CDN scheduling center determines a second IP address based on the first IP address, where the second IP address is an IP address of a target CDN edge node corresponding to the first IP address. The CDN scheduling center sends the second IP address to the scheduling proxy server, so that after the scheduling proxy server sends the second IP address to the terminal device, the terminal device obtains delivery content from the target CDN edge node based on the second IP address.

In this embodiment of this application, the play authentication server returns different types of scheduling information to the terminal device, so that the CDN scheduling center that supports cloud-side proxy scheduling and the CDN scheduling center that does not support cloud-side proxy scheduling can be compatible. For the CDN scheduling center that supports cloud-side proxy scheduling, after receiving the play authentication request message from the terminal device, the play authentication server performs authentication on the target user and/or the target content. In addition, when determining that the authentication result is that the authentication succeeds, the play authentication server instead of the terminal device further sends the scheduling request message to the CDN scheduling center, to obtain the IP address of the scheduled CDN edge node in the target content delivery network. Finally, the play authentication server uses the play authentication response message sent to the terminal device to carry the authentication result indicating that the authentication succeeds and the IP address of the scheduled CDN edge node. In addition, for the scheduling center that does not support cloud-side proxy scheduling, after receiving the play authentication request message from the terminal device, the play authentication server performs authentication on the target user and/or the target content. In addition, when determining that the authentication result is that the authentication succeeds, the play authentication server further obtains the IP address of the CDN scheduling center. Finally, the play authentication server uses the play authentication response message sent to the terminal device to carry the authentication result indicating that the authentication succeeds and the IP address of the CDN scheduling center. In other words, in this embodiment of this application, a play authentication process and a domain name resolution process are combined, and the terminal device does not need to request a DNS to perform domain name resolution, but can directly obtain the scheduling information related to the target CDN edge node through play authentication, so that correctness of the IP address that is of the CDN edge node and that is obtained by the terminal device can be ensured. Therefore, a play success rate is increased, and a play start delay is reduced.

It may be understood that, in the embodiment shown in FIG. 3, the play authentication server implements two functions: play authentication and scheduling proxy, and the play authentication server may be considered as a scheduling proxy server. In another possible implementation, the two functions: play authentication and scheduling proxy may be separately performed by two devices, the play authentication server implements only the play authentication function, and a scheduling proxy server is added to a network side to implement the scheduling proxy function. For example, the scheduling proxy server receives a first request message from a terminal device, where the first request message includes a first IP address, and the first IP address is an IP address of the terminal device. The scheduling proxy server determines, based on the first IP address and preconfigured configuration information of a CDN scheduling center, a target CDN scheduling center corresponding to the first IP address. When the target CDN scheduling center supports proxy scheduling setting, the scheduling proxy server sends a second request message to the target CDN scheduling center, where the second request message includes the first IP address, so that the target CDN scheduling center determines a second IP address based on the first IP address, and the second IP address is an IP address of a target CDN edge node corresponding to the first IP address; the scheduling proxy server receives the second IP address sent by the target CDN scheduling center; and the scheduling proxy server sends a request response message to the terminal device, where the request response message carries the second IP address, so that the terminal device obtains delivery content from the target CDN edge node based on the second IP address. When the target CDN scheduling center does not support proxy scheduling setting, the scheduling proxy server sends a request response message to the terminal device, where the request response message carries a third IP address, and the third IP address is an IP address of the target CDN scheduling center, so that the terminal device obtains the second IP address from the target CDN scheduling center based on the third IP address, and then obtains the delivery content from the target CDN edge node based on the second IP address. In this implementation, the scheduling proxy server implements the scheduling proxy function, and a DNS does not need to perform domain name resolution, so that correctness of the IP address that is of the target CDN scheduling center and that is obtained by the terminal device or correctness of the IP address that is of the CDN edge node and that is obtained by the terminal device can be ensured. Therefore, a play success rate is increased.

Figure 4A:
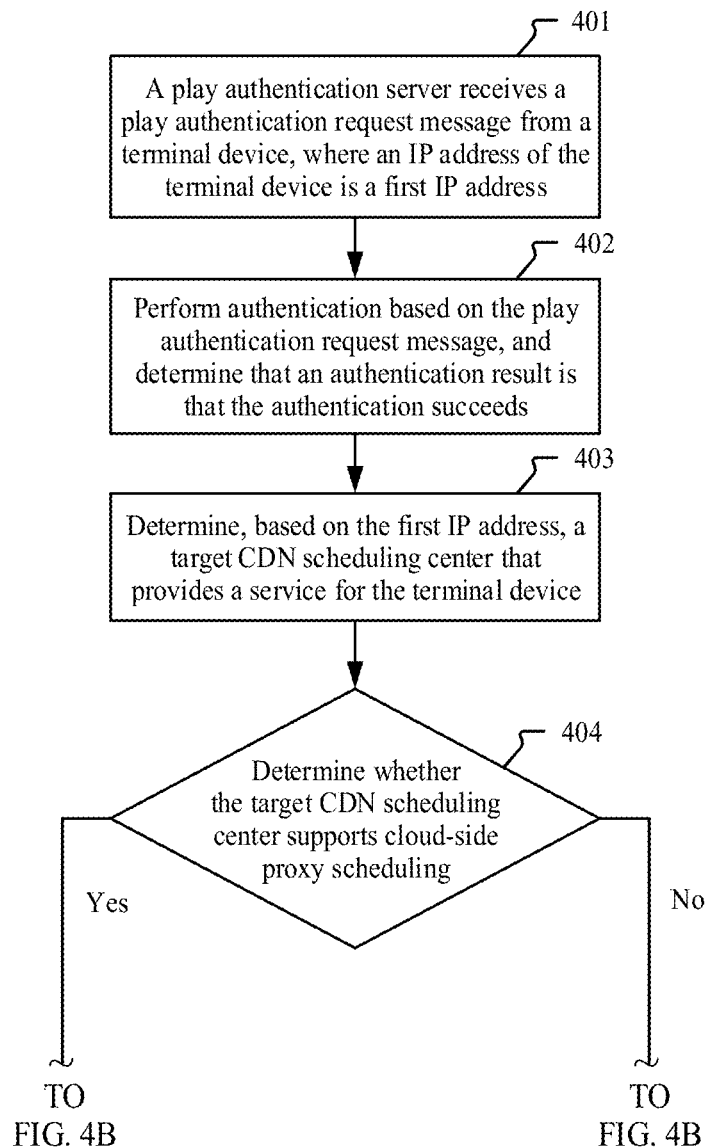
FIG. 4A and FIG. 4B are a flowchart of another CDN edge node scheduling method according to an embodiment of this application.
Figure 4B:
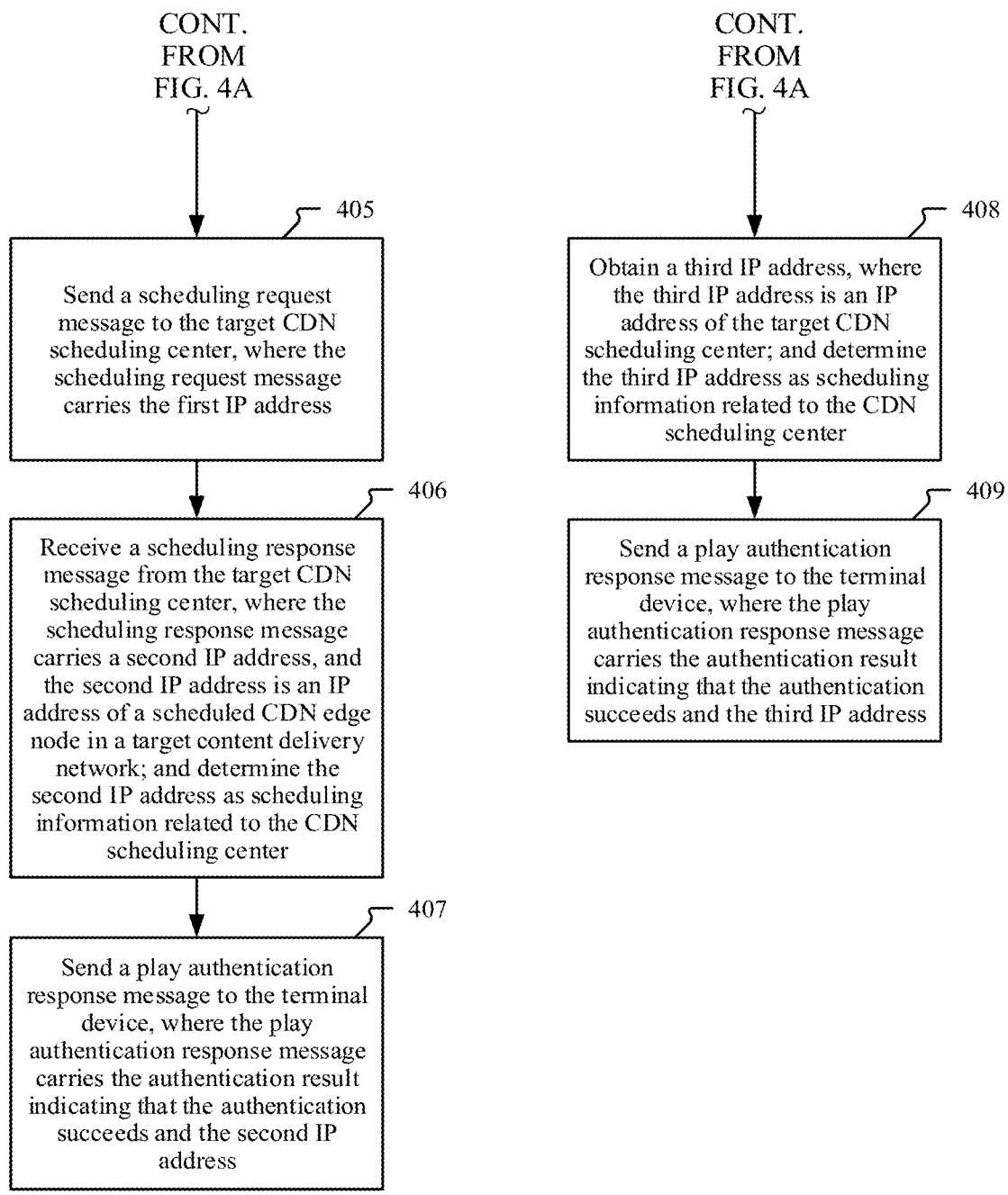

FIG. 4A and FIG. 4B are a flowchart of another CDN edge node scheduling method according to an embodiment of this application. This embodiment may be based on the application scenario shown in FIG. 1B. To be specific, it is assumed that some CDN scheduling centers support cloud-side proxy scheduling and some CDN scheduling centers do not support cloud-side proxy scheduling, and it is assumed that a play authentication server serves as a scheduling proxy server and the play authentication server is an execution body. The following operation procedure may be included.

Step 401: The play authentication server receives a play authentication request message from a terminal device, where the play authentication request message is used to request to perform authentication on a target user and/or target content, and an IP address of the terminal device is a first IP address.

Step 402: The play authentication server performs authentication on the target user and/or the target content based on the play authentication request message, and determines that an authentication result is that the authentication succeeds.

Step 403: The play authentication server determines, based on the first IP address, a target CDN scheduling center that provides a service for the terminal device.

Step 404: The play authentication server determines, based on configuration information of the CDN scheduling center, whether the target CDN scheduling center supports cloud-side proxy scheduling.

If it is determined that the target CDN scheduling center supports cloud-side proxy scheduling, step 405 to step 407 are performed. If it is determined that the target CDN scheduling center does not support cloud-side proxy scheduling, step 408 and step 409 are performed.

Step 405: The play authentication server sends a scheduling request message to the target CDN scheduling center, where the scheduling request message carries the first IP address, and the scheduling request message is used to request the target CDN scheduling center to schedule a CDN edge node in a target content delivery network based on the first IP address.

Step 406: The play authentication server receives a scheduling response message from the target CDN scheduling center, where the scheduling response message carries a second IP address, and the second IP address is an IP address of the scheduled CDN edge node in the target content delivery network; and determines the second IP address as scheduling information related to the scheduling center.

Step 407: The play authentication server sends a play authentication response message to the terminal device, where the play authentication response message carries the authentication result indicating that the authentication succeeds and the second IP address.

Subsequently, the terminal device sends, based on the second IP address, a play request message to the CDN edge node corresponding to the second IP address.

Step 408: The play authentication server obtains a third IP address, where the third IP address is an IP address of the target CDN scheduling center; and determines the third IP address as scheduling information related to the scheduling center.

Step 409: The play authentication server sends a play authentication response message to the terminal device, where the play authentication response message carries the authentication result indicating that the authentication succeeds and the third IP address.

Subsequently, the terminal device sends, based on the third IP address, a scheduling request message to the CDN scheduling center corresponding to the third IP address.

In this embodiment of this application, the play authentication server provides two functions. One function is an authentication function, and the other function is a function of returning scheduling information to the terminal device. The play authentication server returns different types of scheduling information to the terminal device, so that the CDN scheduling center that supports cloud-side proxy scheduling and the CDN scheduling center that does not support cloud-side proxy scheduling can be compatible, and correctness of the IP address that is of the CDN edge node and that is obtained by the terminal device can be ensured. Therefore, a play success rate is increased, and interaction between the terminal device and a network side device is reduced, so that a play start delay is reduced.

Figure 5A:
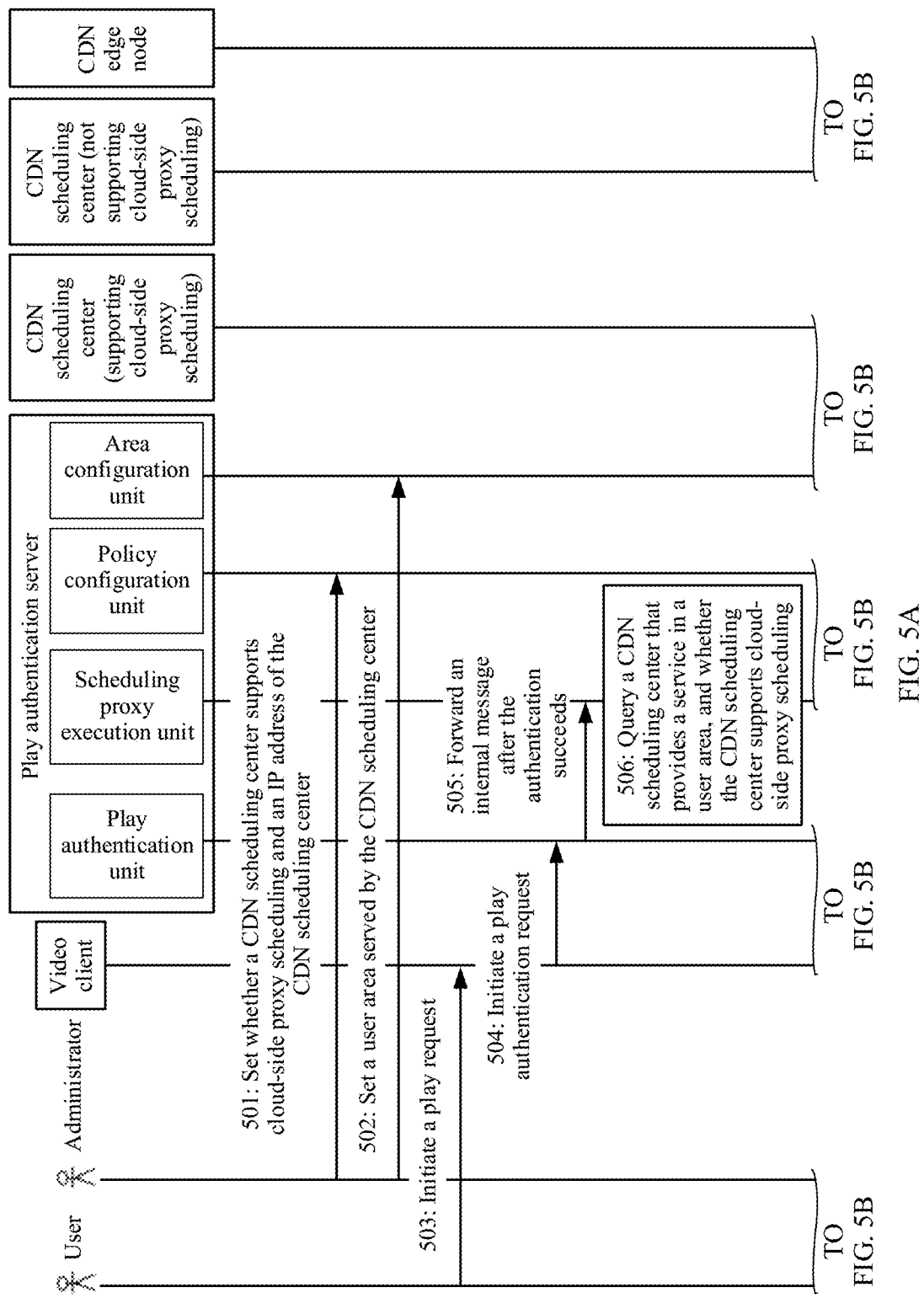
FIG. 5A and FIG. 5B are a schematic communication diagram of another CDN edge node scheduling method according to an embodiment of this application.
Figure 5B:
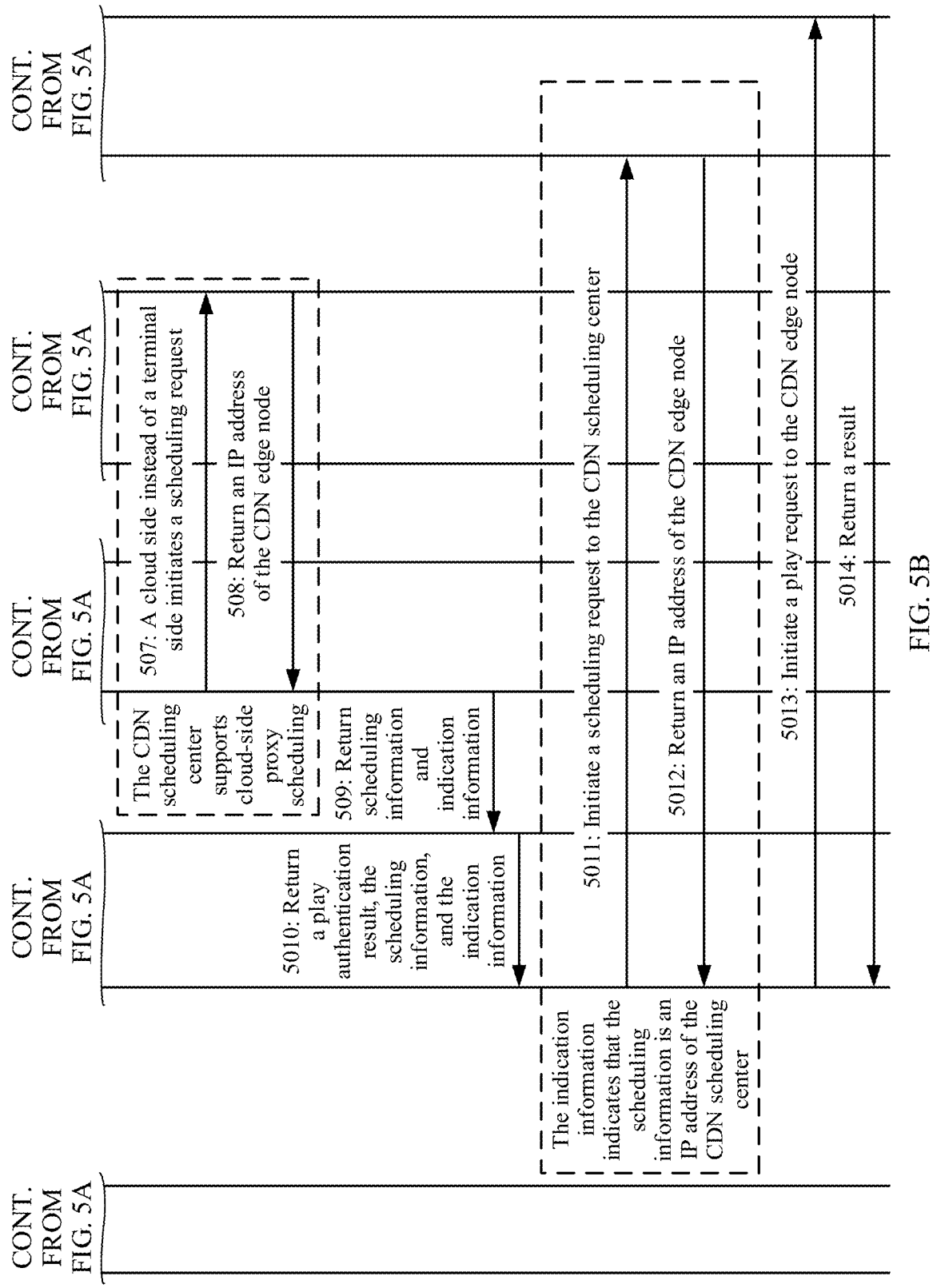

FIG. 5A and FIG. 5B are a schematic communication diagram of another CDN edge node scheduling method according to an embodiment of this application. This embodiment may be based on the application scenario shown in FIG. 1B. To be specific, it is assumed that some CDN scheduling centers support cloud-side proxy scheduling and some CDN scheduling centers do not support cloud-side proxy scheduling, and it is assumed that a play authentication server serves as a scheduling proxy server. The play authentication server is divided into a play authentication unit, a scheduling proxy execution unit, a policy configuration unit, and an area configuration unit. The following operation procedure may be included.

Step 501: An administrator sets whether a CDN scheduling center supports cloud-side proxy scheduling and an IP address of the CDN scheduling center, and stores such configuration information in a scheduling manner policy library.

Step 502: The administrator sets a user area served by the CDN scheduling center, where the user area may be determined based on an IP address range.

Step 503: A user initiates a play request.

Step 504: A video client (that is, a terminal-side app) initiates a play authentication request to the play authentication server.

Step 505: After determining that authentication succeeds, the play authentication server forwards an internal message to the scheduling proxy execution unit.

Step 506: The scheduling proxy execution unit queries a user area in which a play is initiated, a CDN scheduling center that provides a service, and whether the CDN scheduling center supports cloud-side proxy scheduling.

If the CDN scheduling center supports cloud-side proxy scheduling, step 507 and step 508 are performed, but step 5011 or step 5012 is not performed. If the CDN scheduling center does not support cloud-side proxy scheduling, step 5011 and step 5012 are performed, but step 507 or step 508 is not performed. Step 507: If the CDN scheduling center supports cloud-side proxy scheduling, the scheduling proxy execution unit initiates a request to the CDN scheduling center, where a request message body carries an IP address of an app that initiates the play request.

Step 508: The CDN scheduling center performs scheduling based on the IP address in the scheduling request message body, and returns an IP address of a corresponding CDN edge node.

Step 509: The scheduling proxy execution unit returns internal request result information to the play authentication server, where the message indicates whether the returned IP address is the IP address of the CDN edge node or an IP address of the CDN scheduling center.

Step 5010: The play authentication server returns authentication result information to the video client through a play authentication response message, where the message carries scheduling information, and the message indicates whether the returned IP address is the IP address of the CDN edge node or the IP address of the CDN scheduling center.

Step 5011: If the returned scheduling information indicates the IP address of the CDN scheduling center, the video client initiates a scheduling request to the CDN scheduling center.

Step 5012: The CDN scheduling center returns an IP address of a CDN edge node that provides a service. Step 5013: The video client initiates a play request to the CDN edge node.

Step 5014: The CDN edge node returns result information, and the video client downloads play data, and starts to play a video.

In this embodiment of this application, the play authentication server provides scheduling information for a terminal device, so that a play success rate is increased, a play start delay is reduced, and user experience is greatly improved.

In a specific case, a video service provider leases services of a plurality of third-party CDNs. The video service provider has its own CDN service, and also uses services of a plurality of other third-party CDN vendors.

After a video service is provided for a user, a terminal side is used at the beginning to initiate DNS scheduling to a CDN scheduling center. After the user initiates a play request, play authentication is first performed. Then, based on a CDN service provider allocated to the terminal side, the terminal side initiates a scheduling request to a CDN scheduling center of the CDN service provider. Many users who initiate plays are access users of small operators, and quality of networks accessed by some users is relatively poor. Therefore, DNS hijacking in scheduling requests causes a specific quantity of play failures, which are more than 50% of play failures. In addition, at the beginning, DNS scheduling has a problem of scheduling imprecision. There are CDN edge nodes in Guangzhou and Shenzhen, but a user cannot be precisely scheduled to a CDN edge node in a corresponding city in which the user is located.

Then, to implement precise scheduling, HTTP scheduling is used. However, DNS hijacking still exists. In addition, HTTP scheduling initiated by a terminal side increases message exchange, resulting in an increase in a play start delay. Consequently, user experience is affected.

To improve user experience, increase a play success rate, and reduce a play start delay, a play authentication server of a video service is reconstructed to have a scheduling proxy function. For a self-owned CDN and a leased third-party CDN that supports cloud-side proxy scheduling, the play authentication server performs proxy scheduling. For a user in an area served by the self-owned CDN, a delay of a scheduling request initiated by a terminal side is reduced by more than 150 ms (for example, the play authentication server and a CDN scheduling center are in a same equipment room). For a third-party CDN that supports cloud-side proxy scheduling in third-party CDNs, compared with that in a case in which the terminal side initiates scheduling, a play start delay is reduced by more than 100 ms. In addition, a play failure caused by a scheduling reason of DNS domain hijacking is resolved, and a play failure rate is reduced by nearly 50%. This greatly improves user experience.

In the embodiments of this application, a play authentication service is upgraded to a play authentication service and a scheduling proxy service. Through cloud-side proxy scheduling, a play success rate is increased, a play start delay is reduced, and user experience is greatly improved.

The foregoing describes the CDN edge node scheduling methods provided in the embodiments of this application. The following describes a play authentication server, a terminal device, and a CDN scheduling center that are provided in the embodiments of this application.

Figure 6:
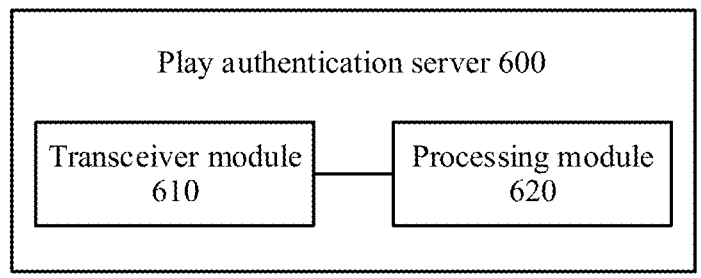
FIG. 6 is a schematic block diagram of a scheduling proxy server according to an embodiment of this application.

FIG. 6 is a schematic block diagram of a play authentication server 600 according to an embodiment of this application. The play authentication server 600 includes: a transceiver module 610, configured to receive a play authentication request message from a terminal device, where the play authentication request message is used to request to perform authentication on a target user and/or target content, and an IP address of the terminal device is a first IP address; and a processing module 620, configured to: perform authentication on the target user and/or the target content based on the play authentication request message, and determine that an authentication result is that the authentication succeeds; determine, based on the first IP address, a target CDN scheduling center that provides a service for the terminal device; and obtain, based on configuration information of the target CDN scheduling center, scheduling information related to the target CDN scheduling center.

The transceiver module 610 is further configured to send a play authentication response message to the terminal device, where the play authentication response message carries the authentication result that indicates that the authentication succeeds and that is determined by the processing module 620 and the scheduling information obtained by the processing module 620.

In this embodiment of this application, a play authentication process and a domain name resolution process are combined, and the terminal device does not need to request a DNS to perform domain name resolution, but can directly obtain the scheduling information related to the target CDN scheduling center through play authentication, so that correctness of an IP address that is of a CDN edge node and that is obtained by the terminal device can be ensured. Therefore, a play success rate is increased, and a play start delay is reduced.

Optionally, in an embodiment, that the processing module 620 is configured to obtain, based on configuration information of the target CDN scheduling center, scheduling information related to the target CDN scheduling center includes: the processing module 620 is configured to: determine, based on the configuration information of the target CDN scheduling center, whether the target CDN scheduling center supports cloud-side proxy scheduling; when determining that the target CDN scheduling center supports cloud-side proxy scheduling, send a scheduling request message to the target CDN scheduling center by using the transceiver module 610, where the scheduling request message carries the first IP address, and the scheduling request message is used to request the target CDN scheduling center to schedule a CDN edge node in a target content delivery network based on the first IP address; receive a scheduling response message from the target CDN scheduling center by using the transceiver module, where the scheduling response message carries a second IP address, and the second IP address is an IP address of the scheduled CDN edge node in the target content delivery network; and determine the second IP address as the scheduling information related to the target CDN scheduling center.

Further, the play authentication response message sent by the transceiver module 610 further carries first indication information, and the first indication information is used to indicate that the second IP address is the IP address of the scheduled CDN edge node in the target content delivery network.

Optionally, in an embodiment, that the processing module 620 is configured to obtain, based on configuration information of the target CDN scheduling center, scheduling information related to the target CDN scheduling center includes: the processing module 620 is configured to: determine, based on the configuration information of the target CDN scheduling center, whether the target CDN scheduling center supports cloud-side proxy scheduling; when determining that the target CDN scheduling center does not support cloud-side proxy scheduling, obtain a third IP address, where the third IP address is an IP address of the target CDN scheduling center; and determines the third IP address as the scheduling information related to the target CDN scheduling center.

Further, the play authentication response message sent by the transceiver module 610 further carries second indication information, and the second indication information is used to indicate that the third IP address is the IP address of the target CDN scheduling center.

It should be understood that the processing module 620 in this embodiment of this application may be implemented by a processor or a processor-related circuit component, and the transceiver module 610 may be implemented by a transceiver or a transceiver-related circuit component.

Figure 7:
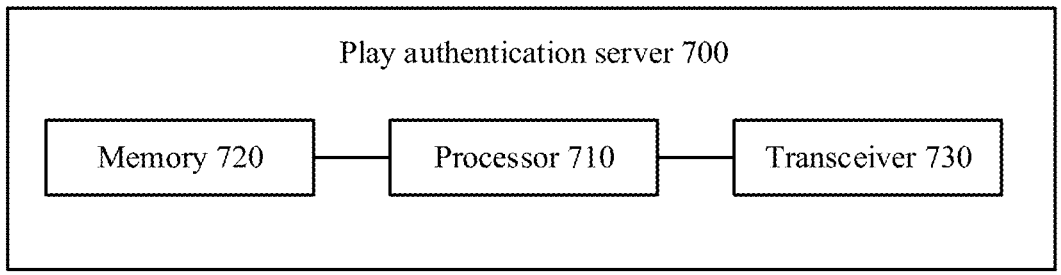
FIG. 7 is a schematic block diagram of another scheduling proxy server according to an embodiment of this application.

As shown in FIG. 7, an embodiment of this application further provides a play authentication server 700. The play authentication server 700 includes a processor 710, a memory 720, and a transceiver 730. The memory 720 stores an instruction or a program. The processor 710 is configured to execute the instruction or the program stored in the memory 720. When the instruction or the program stored in the memory 720 is executed, the processor 710 is configured to perform the operation performed by the processing module 620 in the foregoing embodiment, and the transceiver 730 is configured to perform the operation performed by the transceiver module 610 in the foregoing embodiment.

It should be understood that the play authentication server 600 or the play authentication server 700 in the embodiments of this application may correspond to the play authentication server in the methods corresponding to FIG. 2 to FIG. 5A and FIG. 5B in the embodiments of this application. In addition, operations and/or functions of modules in the play authentication server 600 or the play authentication server 700 are used to implement corresponding procedures of the methods in FIG. 2 to FIG. 5A and FIG. 5B. For brevity, details are not described herein.

It should be noted that the play authentication server shown in FIG. 6 or FIG. 7 implements two functions: play authentication and scheduling proxy, and the play authentication server may be considered as a scheduling proxy server. In another possible implementation, the two functions: play authentication and scheduling proxy may be separately performed by two devices, the play authentication server implements only the play authentication function, and a scheduling proxy server is added to a network side to implement the scheduling proxy function. For a structure of the scheduling proxy server, refer to a structure of the play authentication server. Details are not described herein. In this implementation, the scheduling proxy server implements the scheduling proxy function, and a DNS does not need to perform domain name resolution, so that correctness of an IP address that is of a CDN edge node and that is obtained by a terminal device can be ensured. Therefore, a play success rate is increased.

Figure 8:
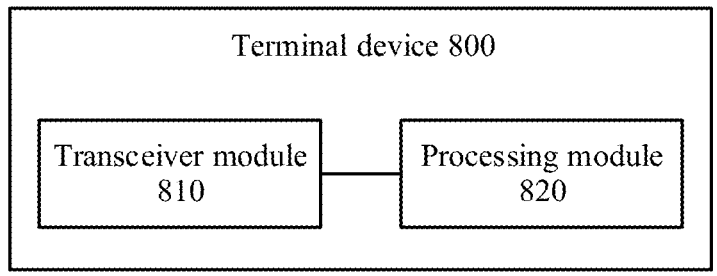
FIG. 8 is a schematic block diagram of a terminal device according to an embodiment of this application.

FIG. 8 is a schematic block diagram of a terminal device 800 according to an embodiment of this application. The terminal device 800 includes: a transceiver module 810, configured to: send a play authentication request message to a play authentication server, where the play authentication request message is used to request to perform authentication on a target user and/or target content, and an IP address of the terminal device is a first IP address; and receive a play authentication response message from the play authentication server, where the play authentication response message carries an authentication result indicating that the authentication succeeds and scheduling information; and a processing module 820, configured to obtain a second IP address based on the scheduling information received by the transceiver module 810, where the second IP address is an IP address of a scheduled CDN edge node in a target content delivery network.

In this embodiment of this application, a play authentication process and a domain name resolution process are combined, and the terminal device does not need to request a DNS to perform domain name resolution, but can directly obtain the scheduling information related to a target CDN scheduling center through play authentication, so that correctness of the IP address that is of the CDN edge node and that is obtained by the terminal device can be ensured. Therefore, a play success rate is increased, and a play start delay is reduced.

Optionally, in an embodiment, the scheduling information received by the transceiver module 810 is the second IP address.

That the processing module 820 is configured to obtain a second IP address based on the scheduling information received by the transceiver module 810 includes: the processing module 820 determines the scheduling information received by the transceiver module 810 as the second IP address.

Further, the play authentication response message received by the transceiver module 810 further carries first indication information, and the first indication information is used to indicate that the second IP address is the IP address of the scheduled CDN edge node in the target content delivery network.

Optionally, in an embodiment, the scheduling information received by the transceiver module 810 is a third IP address, and the third IP address is an IP address of a target CDN scheduling center.

That the processing module 820 is configured to obtain a second IP address based on the scheduling information received by the transceiver module 810 includes: the processing module 820 is configured to: send a scheduling request message to the target CDN scheduling center by using the transceiver module 810 based on the scheduling information received by the transceiver module 810, where the scheduling request message is used to request the target CDN scheduling center to schedule a CDN edge node in the target content delivery network based on the first IP address; and receive a scheduling response message from the target CDN scheduling center by using the transceiver module 810, where the scheduling response message carries the second IP address.

Further, the play authentication response message received by the transceiver module 810 further carries second indication information, and the second indication information is used to indicate that the third IP address is the IP address of the target CDN scheduling center.

It should be understood that the processing module 820 in this embodiment of this application may be implemented by a processor or a processor-related circuit component, and the transceiver module 810 may be implemented by a transceiver or a transceiver-related circuit component.

Figure 9:
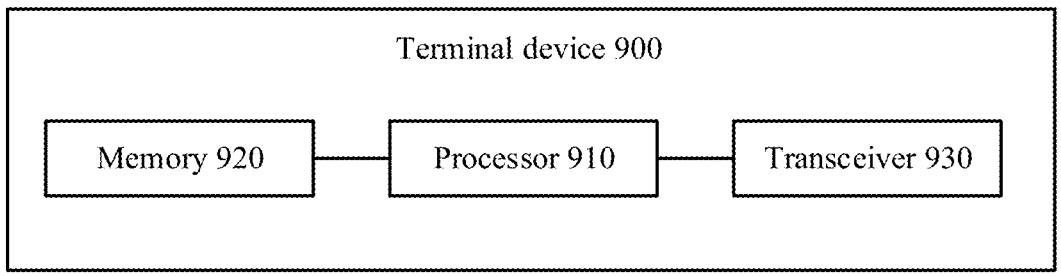
FIG. 9 is a schematic block diagram of another terminal device according to an embodiment of this application.

As shown in FIG. 9, an embodiment of this application further provides a terminal device 900. The terminal device 900 includes a processor 910, a memory 920, and a transceiver 930. The memory 920 stores an instruction or a program. The processor 910 is configured to execute the instruction or the program stored in the memory 920. When the instruction or the program stored in the memory 920 is executed, the processor 910 is configured to perform the operation performed by the processing module 820 in the foregoing embodiment, and the transceiver 930 is configured to perform the operation performed by the transceiver module 810 in the foregoing embodiment.

It should be understood that the terminal device 800 or the terminal device 900 in the embodiments of this application may correspond to the terminal device in the method corresponding to FIG. 2, FIG. 3, or FIG. 5A and FIG. 5B in the embodiments of this application. In addition, operations and/or functions of modules in the terminal device 800 or the terminal device 900 are used to implement corresponding procedures of the method in FIG. 2, FIG. 3, or FIG. 5A and FIG. 5B. For brevity, details are not described herein.

Figure 10:
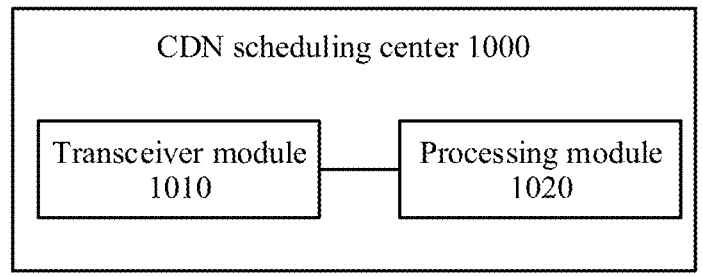
FIG. 10 is a schematic block diagram of a CDN scheduling center according to an embodiment of this application.

FIG. 10 is a schematic block diagram of a CDN scheduling center 1000 according to an embodiment of this application. The CDN scheduling center 1000 includes: a transceiver module 1010, configured to receive a scheduling request message from a scheduling proxy server, where the scheduling request message is triggered by first request information sent by a terminal device, the first request message includes a first internet protocol IP address, the first IP address is an IP address of the terminal device, and the scheduling request message includes the first IP address; and a processing module 1020, configured to determine a second IP address based on the first IP address, where the second IP address is an IP address of a target CDN edge node corresponding to the first IP address.

The transceiver module 1010 is further configured to send the second IP address to the scheduling proxy server, so that after the scheduling proxy server sends the second IP address to the terminal device, the terminal device obtains delivery content from the target CDN edge node based on the second IP address.

In this embodiment of this application, the CDN scheduling center supports cloud-side proxy scheduling, a play authentication process and a domain name resolution process are combined, and the terminal device does not need to request a DNS to perform domain name resolution, but can directly obtain scheduling information related to the CDN scheduling center through play authentication, so that correctness of the IP address that is of the CDN edge node and that is obtained by the terminal device can be ensured. Therefore, a play success rate is increased, and a play start delay is reduced.

It should be understood that the processing module 1020 in this embodiment of this application may be implemented by a processor or a processor-related circuit component, and the transceiver module 1010 may be implemented by a transceiver or a transceiver-related circuit component.

Figure 11:
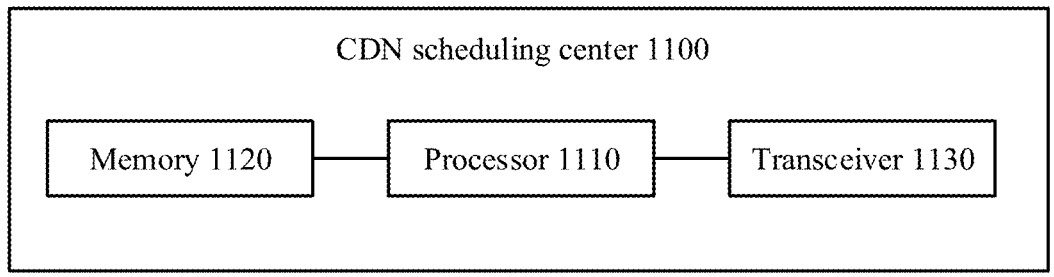
FIG. 11 is a schematic block diagram of another CDN scheduling center according to an embodiment of this application.

As shown in FIG. 11, an embodiment of this application further provides a CDN scheduling center 1100. The CDN scheduling center 1100 includes a processor 1110, a memory 1120, and a transceiver 1130. The memory 1120 stores an instruction or a program. The processor 1110 is configured to execute the instruction or the program stored in the memory 1120. When the instruction or the program stored in the memory 1120 is executed, the processor 1110 is configured to perform the operation performed by the processing module 1020 in the foregoing embodiment, and the transceiver 1130 is configured to perform the operation performed by the transceiver module 1010 in the foregoing embodiment.

It should be understood that the CDN scheduling center 1000 or the CDN scheduling center 1100 in the embodiments of this application may correspond to the CDN scheduling center in the method corresponding to FIG. 2, FIG. 3, or FIG. 5A and FIG. 5B in the embodiments of this application. In addition, operations and/or functions of modules in the CDN scheduling center 1000 or the CDN scheduling center 1100 are used to implement corresponding procedures of the method in FIG. 2, FIG. 3, or FIG. 5A and FIG. 5B. For brevity, details are not described herein.

An embodiment of this application further provides a computer-readable storage medium. The computer-readable storage medium stores a computer program. When the program is executed by a processor, a procedure related to a play authentication server or a scheduling proxy server in the method provided in the foregoing method embodiments can be implemented.

An embodiment of this application further provides a computer-readable storage medium. The computer-readable storage medium stores a computer program. When the program is executed by a processor, a procedure related to a terminal device in the method provided in the foregoing method embodiments can be implemented.

An embodiment of this application further provides a computer-readable storage medium. The computer-readable storage medium stores a computer program. When the program is executed by a processor, a procedure related to a CDN scheduling center in the method provided in the foregoing method embodiments can be implemented.

An embodiment of this application further provides a communications apparatus, and the communications apparatus may be a terminal device or a circuit. The communications apparatus may be configured to perform an action performed by the terminal device in the foregoing method embodiments.

Figure 12:
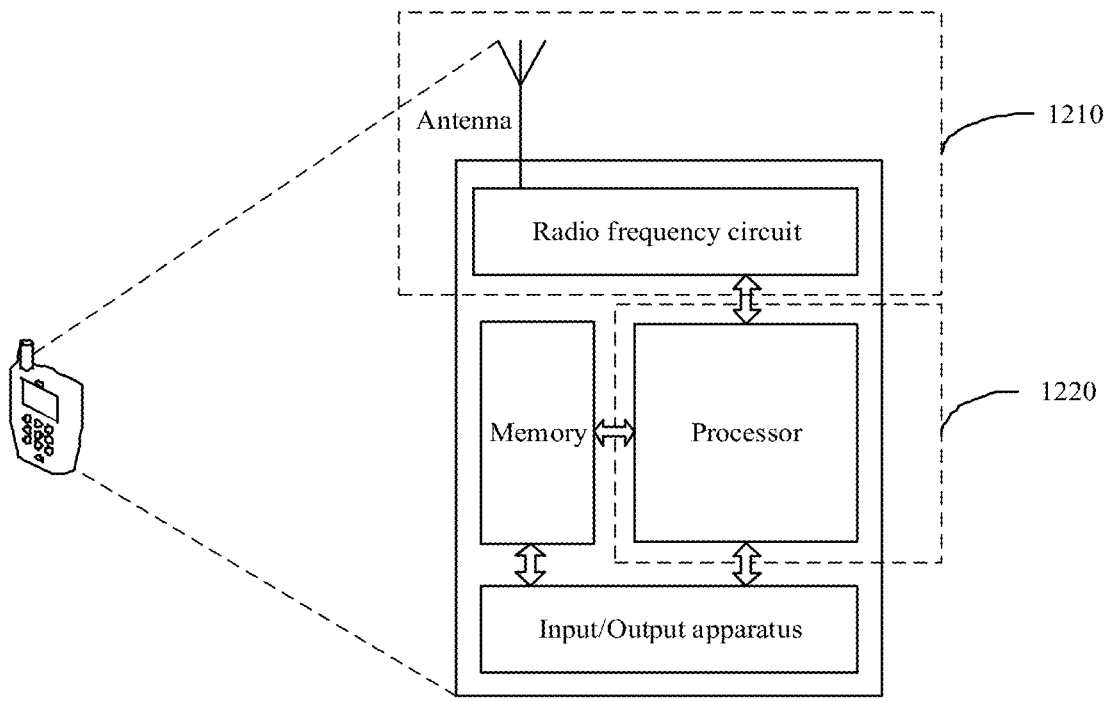
FIG. 12 is a schematic block diagram of a communications apparatus according to an embodiment of this application.

When the communications apparatus is a terminal device, FIG. 12 is a simplified schematic structural diagram of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send/receive a radio frequency signal in a form of an electromagnetic wave. The input/output apparatus, such as a touchscreen, a display, or a keyboard, is mainly configured to receive data entered by a user and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit may also be sometimes referred to as a transceiver machine, a transceiver, a transceiver circuit, or the like. The receiving unit may also be sometimes referred to as a receiving machine, a receiver, a receiver circuit, or the like. The sending unit may also be sometimes referred to as a transmitter machine, a transmitter, a transmitter circuit, or the like.

It should be understood that the transceiver unit 1210 is configured to perform the sending operation and the receiving operation on the terminal device side in the foregoing method embodiments, and the processing unit 1220 is configured to perform an operation other than the sending operation and the receiving operation of the terminal device in the foregoing method embodiments.

For example, in an implementation, the transceiver unit 1210 is configured to perform the sending operation on the terminal device side in step 201 in FIG. 2, and/or the transceiver unit 1210 is further configured to perform other sending and receiving steps on the terminal device side in the embodiments of this application. The processing unit 1220 is configured to perform step 306 in FIG. 3, and/or the processing unit 1220 is further configured to perform another processing step on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 13:
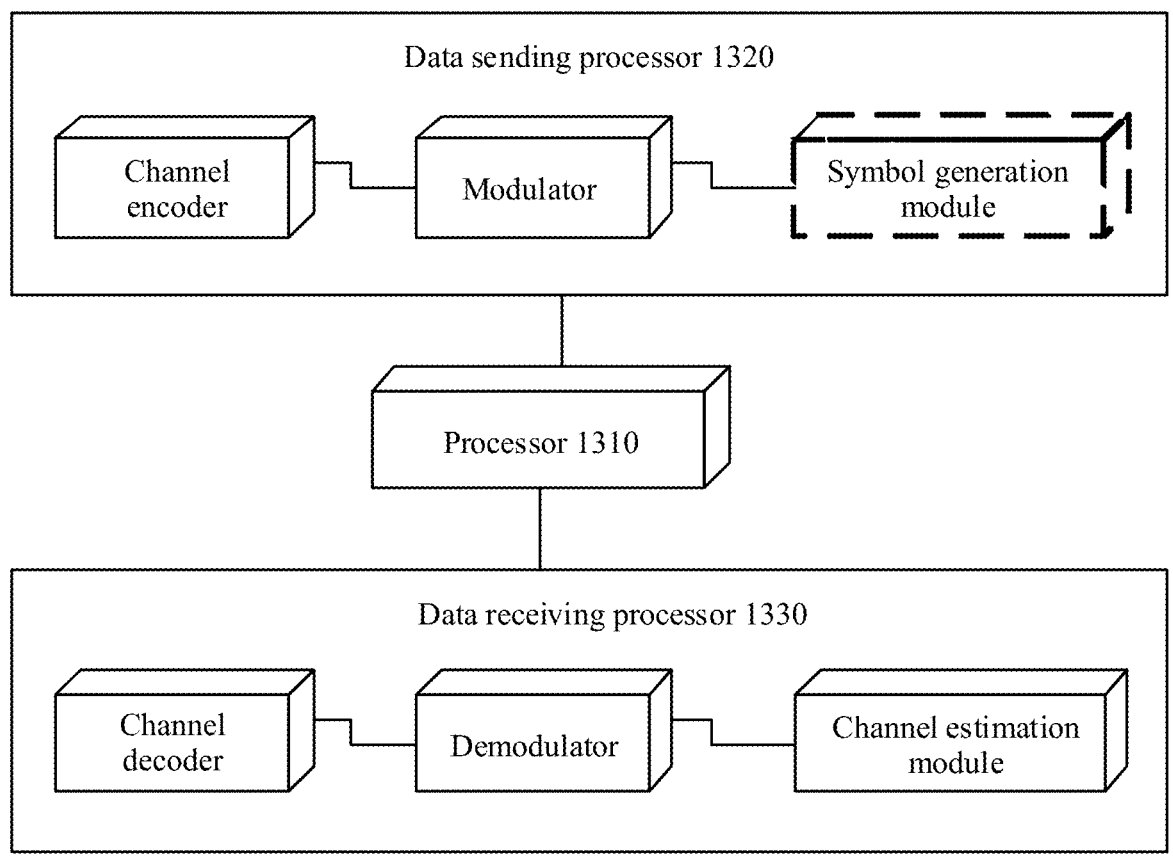
FIG. 13 is a schematic block diagram of another communications apparatus according to an embodiment of this application.

When the communications apparatus in this embodiment is a terminal device, refer to a device shown in FIG. 13. In an example, the device may implement a function similar to that of the processor 910 in FIG. 9. In FIG. 13, the device includes a processor 1310, a data sending processor 1320, and a data receiving processor 1330. The processing module 820 in the foregoing embodiment may be the processor 1310 in FIG. 13, and implements a corresponding function. The transceiver module 810 in the foregoing embodiment may be the data sending processor 1320 and/or the data receiving processor 1330 in FIG. 13. Although FIG. 13 shows a channel encoder and a channel decoder, it may be understood that these modules are merely examples, and do not constitute a limitation on this embodiment.

Figure 14:
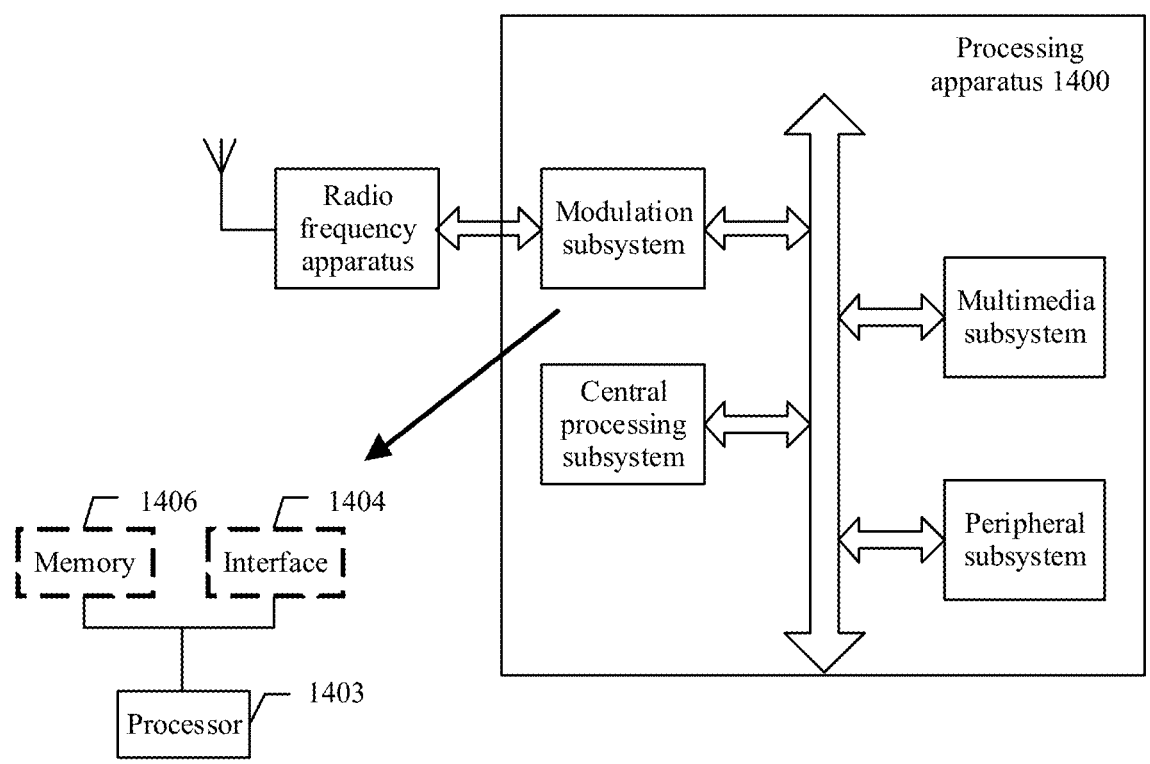
FIG. 14 is a schematic block diagram of another communications apparatus according to an embodiment of this application.

FIG. 14 shows another form of this embodiment. A processing apparatus 1400 includes modules such as a modulation subsystem, a central processing subsystem, and a peripheral subsystem. The communications apparatus in the embodiments may be used as the modulation subsystem in the processing apparatus. Specifically, the modulation subsystem may include a processor 1403 and an interface 1404. The processor 1403 implements a function of the processing module 820, and the interface 1404 implements a function of the transceiver module 810. In another variation, the modulation subsystem includes a memory 1406, a processor 1403, and a program that is stored in the memory 1406 and that can be run on the processor. When executing the program, the processor 1403 implements the method on the terminal device side in the foregoing method embodiments. It should be noted that the memory 1406 may be nonvolatile or volatile. The memory 1406 may be located in the modulation subsystem, or may be located in the processing apparatus 1400, provided that the memory 1406 can be connected to the processor 1403.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product that includes instructions is provided. When the instructions are executed, the method on the terminal device side in the foregoing method embodiments is performed.

It should be understood that, the processor mentioned in the embodiments of this application may be a central processing unit (Central Processing Unit, CPU), another general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification includes but is not limited to the memories and any other appropriate types of memories.

It should be further understood that first, second, third, and various numbers in this specification are merely used for differentiation for ease of description, but are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units or modules is merely logical function division. There may be another division manner in actual implementation. For example, a plurality of units, modules, or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units or modules described as separate parts may or may not be physically separate, and parts displayed as units may or may not be physical units, may be located in one location, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A content delivery network (CDN) edge node scheduling method implemented by a proxy server, wherein the CDN edge node scheduling method comprises:
    receiving, from a client device, a first request message comprising a first Internet Protocol (IP) address of the client device;
    obtaining, based on the first IP address and preconfigured configuration information of a CDN scheduling center, a target CDN scheduling center corresponding to the first IP address;
    sending, to the target CDN scheduling center, a second request message comprising the first IP address;
    receiving, from the target CDN scheduling center, a second IP address of a target CDN edge node corresponding to the first IP address;
    sending, to the client device, a request response message comprising the second IP address to enable the client device to obtain delivery content from the target CDN edge node based on the second IP address; and
    sending, to a terminal device, when the target CDN scheduling center does not support proxy scheduling setting, a second request response message comprising a third IP address of the target CDN scheduling center to enable the terminal device to obtain the second IP address from the target CDN scheduling center based on the third IP address and to obtain the delivery content from the target CDN edge node based on the second IP address.

2. The CDN edge node scheduling method of claim 1, wherein before determining the target CDN scheduling center corresponding to the first IP address, the CDN edge node scheduling method further comprises determining, based on the first request message, that the delivery content is successfully authenticated.

3. The CDN edge node scheduling method of claim 2, wherein the request response message further comprises an authentication result indicating that the delivery content was successfully authenticated.

4. The CDN edge node scheduling method of claim 1, wherein the preconfigured configuration information comprises:
first information about a correspondence between the first IP address and the CDN scheduling center; and
second information about whether the CDN scheduling center supports proxy scheduling.

5. The CDN edge node scheduling method of claim 1, wherein the preconfigured configuration information comprises:
first information about a correspondence between the first IP address and a user area;
second information about a correspondence between the user area and the CDN scheduling center; and
third information about whether the CDN scheduling center supports proxy scheduling.

6. The CDN edge node scheduling method of claim 1, wherein when the target CDN scheduling center supports proxy scheduling setting, the request response message further carries first indication information indicating that the second IP address is of the target CDN edge node.

7. The CDN edge node scheduling method of claim 1, wherein when the target CDN scheduling center does not support proxy scheduling setting, the request response message further carries second indication information indicating that the third IP address is of the target CDN scheduling center.

8. The CDN edge node scheduling method of claim 1, wherein the first request message requests the proxy server to perform authentication on a target user, and wherein before determining the target CDN scheduling center, the CDN edge node scheduling method further comprises:
performing, based on the first request message, the authentication on the target user to obtain an authentication result of the target user; and
determining, based on the authentication result, that the authentication has succeeded.

9. A content delivery network (CDN) edge node scheduling method implemented by a client device, wherein the CDN edge node scheduling method comprises:
sending a first request message to a scheduling proxy server, wherein the first request message comprises a first Internet Protocol (IP) address of the client device;
receiving a request response message from the scheduling proxy server, wherein when a target CDN scheduling center corresponding to the first IP address supports proxy scheduling setting, the request response message carries a second IP address of a target CDN edge node corresponding to the first IP address;
obtaining delivery content from the target CDN edge node based on the second IP address, wherein when the target CDN scheduling center corresponding to the first IP address does not support proxy scheduling setting, the request response message carries a third IP address of the target CDN scheduling center;
obtaining the second IP address from the target CDN scheduling center based on the third IP address; and
obtaining the delivery content from the target CDN edge node based on the second IP address.

10. The CDN edge node scheduling method of claim 9, further comprising requesting, using the first request message, the scheduling proxy server to perform authentication on the delivery content, wherein the request response message further comprises an authentication result indicating that the authentication on the delivery content succeeds.

11. The CDN edge node scheduling method of claim 9, wherein when the target CDN scheduling center supports proxy scheduling setting, the request response message further carries first indication information, and wherein the first indication information indicates that the second IP address is of the target CDN edge node.

12. The CDN edge node scheduling method of claim 9, wherein when the target CDN scheduling center does not support proxy scheduling setting, the request response message further carries second indication information, and wherein the second indication information indicates that the third IP address is of the target CDN scheduling center.

13. The CDN edge node scheduling method of claim 9, wherein before obtaining delivery content from the target CDN edge node based on the second IP address, the CDN edge node scheduling method further comprises sending, to the target CDN edge node, a second request message to request delivery content.

14. The CDN edge node scheduling method of claim 9, wherein the first request message requests the scheduling proxy server to perform authentication on a target user, and wherein before determining the target CDN scheduling center, the CDN edge node scheduling method further comprises:
performing, based on the first request message, the authentication on the target user to obtain an authentication result of the target user; and
determining, based on the authentication result, that the authentication has succeeded.

15. A client device comprising:
a memory configured to store executable instructions; and
one or more processors coupled to the memory and configured to execute the instructions to cause the client device to:
send a first request message to a scheduling proxy server, wherein the first request message comprises a first Internet Protocol (IP) address of the client device;
receive a request response message from the scheduling proxy server, wherein when a target CDN scheduling center corresponding to the first IP address supports proxy scheduling setting, the request response message carries a second IP address of a target CDN edge node corresponding to the first IP address;
obtain delivery content from the target CDN edge node based on the second IP address, wherein when the target CDN scheduling center corresponding to the first IP address does not support proxy scheduling setting, the request response message carries a third IP address of the target CDN scheduling center;
obtain the second IP address from the target CDN scheduling center based on the third IP address; and
obtain the delivery content from the target CDN edge node based on the second IP address.

16. The client device of claim 15, wherein when the target CDN scheduling center does not support proxy scheduling setting, the request response message further carries second indication information, and wherein the second indication information indicates that the third IP address is of the target CDN scheduling center.

17. The client device of claim 15, wherein the one or more processors are further configured to execute the instructions to cause the client device to request, using the first request message, the scheduling proxy server to perform authentication on the delivery content, wherein the request response message further comprises an authentication result indicating that the authentication on the delivery content succeeds.

18. The client device of claim 15, wherein when the target CDN scheduling center supports proxy scheduling setting, the request response message further carries first indication information, and wherein the first indication information indicates that the second IP address is of the target CDN edge node.

19. The client device of claim 15, wherein the first request message requests the scheduling proxy server to perform authentication on a target user, and wherein before determining the target CDN scheduling center, the one or more processors are further configured to execute the instructions to cause the client device to:
- perform, based on the first request message, the authentication on the target user to obtain an authentication result of the target user; and
- determine, based on the authentication result, that the authentication has succeeded.

20. The client device of claim 15, wherein before obtaining delivery content from the target CDN edge node based on the second IP address, the one or more processors are further configured to execute the instructions to cause the client device to send, to the target CDN edge node, a second request message to request delivery content.

* * * * *